US00RE47156E

(19) United States
(12) Reissued Patent
Erspamer et al.

(10) Patent Number: US RE47,156 E
(45) Date of Reissued Patent: Dec. 11, 2018

(54) TAMPER-EVIDENT BOTTLE AND CLOSURE HAVING VENTS

(71) Applicant: Closure Systems International Inc., Lake Forest, IL (US)

(72) Inventors: John Erspamer, Crawfordsville, IN (US); Steve McBride, Crawfordsville, IN (US); Dave Gevers, Crawfordsville, IN (US); Lawrence M. Smeyak, Crawfordsville, IN (US)

(73) Assignee: Closure Systems International Inc., Memphis, TN (US)

(21) Appl. No.: 15/241,929

(22) Filed: Aug. 19, 2016

Related U.S. Patent Documents

Reissue of:
(64) Patent No.: 8,807,360
Issued: Aug. 19, 2014
Appl. No.: 12/934,916
PCT Filed: Apr. 30, 2009
PCT No.: PCT/US2009/002632
§ 371 (c)(1),
(2) Date: Sep. 27, 2010
PCT Pub. No.: WO2009/154666
PCT Pub. Date: Dec. 23, 2009

U.S. Applications:
(60) Provisional application No. 61/125,981, filed on Apr. 30, 2008.

(51) Int. Cl.
*B65D 41/36* (2006.01)
*B65D 41/34* (2006.01)

(52) U.S. Cl.
CPC ..... *B65D 41/3428* (2013.01)

(58) Field of Classification Search
USPC ..... 215/344, 252, 307, 258, 320, 901; 220/265, 266, 268, 276
See application file for complete search history.

(56) References Cited

U.S. PATENT DOCUMENTS

| | | | | |
|---|---|---|---|---|
| 3,667,638 | A | 6/1972 | Cambio, Jr. | |
| 4,458,822 | A * | 7/1984 | Ostrowsky | 215/252 |
| 4,470,513 | A * | 9/1984 | Ostrowsky | 215/252 |
| 4,505,401 | A * | 3/1985 | Berglund | 215/252 |
| 4,506,795 | A * | 3/1985 | Herr | 215/252 |
| 4,550,844 | A * | 11/1985 | Lininger | 215/252 |

(Continued)

FOREIGN PATENT DOCUMENTS

| | | |
|---|---|---|
| CA | 2721234 A1 | 4/2009 |
| CN | 1367751 A | 9/2002 |

(Continued)

OTHER PUBLICATIONS

Supplemental European Search Report and Written Opinion for corresponding European Application No. E 09766980 dated Nov. 8, 2011.

(Continued)

*Primary Examiner* — Cary E Wehner
(74) *Attorney, Agent, or Firm* — Nixon Peabody LLP

(57) ABSTRACT

A tamper-evident package with pressurized contents which includes a closure and associated container which cooperate to provide desired tamper-evidence upon initial removal of the closure from the container, while promoting convenient and comfortable removal and use by consumers.

23 Claims, 17 Drawing Sheets

Amended

(56) References Cited

U.S. PATENT DOCUMENTS 4,562,931 A * 1/1986 Brach et al. ..... 215/220
4,573,601 A * 3/1986 Berglund ..... 215/252
4,938,370 A * 7/1990 McBride ..... 215/252
4,971,212 A * 11/1990 Kusz ..... 215/252
4,993,570 A 2/1991 Julian et al.
4,997,097 A * 3/1991 Krautkramer ..... 215/307
5,004,112 A 4/1991 McBride
5,050,753 A * 9/1991 Trump et al. ..... 215/252
5,167,335 A * 12/1992 McBride et al. .. B65D 41/3428 215/252
5,205,426 A * 4/1993 McBride et al. ..... 215/252
5,320,234 A * 6/1994 Kamath ..... B65D 41/3409 215/252
5,328,044 A * 7/1994 Rohrs et al. ..... B65D 41/3438 215/252
5,356,021 A * 10/1994 McBride et al. ..... 215/349
5,450,972 A * 9/1995 Zemlo ..... 215/252
5,501,349 A * 3/1996 McCandless ..... 215/252
5,564,582 A * 10/1996 Kamath ..... 215/252
5,588,545 A * 12/1996 King ..... 215/216
5,715,959 A * 2/1998 Pfefferkorn et al. ..... 215/252
5,782,369 A 7/1998 Tansey ..... B65D 41/0428 215/252
5,797,506 A 8/1998 Lehmkuhl et al.
5,800,764 A * 9/1998 Smeyak et al. ..... 264/268
5,819,965 A 10/1998 King
5,860,542 A * 1/1999 Takamatsu ..... B65D 41/3428 215/252
5,950,850 A 9/1999 Takamatsu et al. ..... B65D 41/3428 215/252
6,006,930 A 12/1999 Dreyer et al.
6,089,390 A * 7/2000 Druitt et al. ..... 215/252
6,123,212 A 9/2000 Russell
6,202,872 B1 * 3/2001 Smeyak et al. ..... 215/343
6,276,543 B1 * 8/2001 German et al. ..... 215/252
6,325,225 B1 * 12/2001 Druitt et al. ..... 215/252
6,371,317 B1 * 4/2002 Krueger ..... 215/252
6,484,896 B2 * 11/2002 Ma ..... 215/252
6,527,132 B1 * 3/2003 Druitt et al. ..... 215/341
6,557,714 B2 * 5/2003 Babcock et al. ..... 215/252
6,673,298 B2 * 1/2004 Krueger ..... 264/295
6,705,479 B2 * 3/2004 Druitt et al. ..... 215/252
6,779,672 B2 * 8/2004 Kano et al. ..... 215/344
6,991,123 B2 * 1/2006 Druitt et al. ..... 215/341
7,014,055 B2 * 3/2006 Kano et al. ..... 215/344
7,198,170 B2 * 4/2007 Herr ..... B65D 41/06 215/222
7,344,039 B2 * 3/2008 Bixler et al. ..... 215/252
7,451,898 B2 * 11/2008 Seidita ..... 222/253
7,503,468 B2 * 3/2009 Druitt et al. ..... 222/344
7,607,547 B2 * 10/2009 Kumata et al. ..... 215/252
7,637,384 B2 * 12/2009 Price et al. ..... B65D 41/3428 215/252
7,942,287 B2 5/2011 King
7,975,864 B2 * 7/2011 Druitt et al. ..... 215/344
8,807,360 B2 8/2014 Erspamer
8,910,811 B2 * 12/2014 Parrinello ..... B65D 11/04 215/252
2001/0027957 A1 * 10/2001 Kano ..... 215/341
2002/0030031 A1 * 3/2002 Druitt et al. ..... 215/252
2002/0066713 A1 * 6/2002 Ma ..... 215/252
2002/0134747 A1 * 9/2002 Babcock et al. ..... B65D 1/023 215/252
2003/0116523 A1 * 6/2003 Druitt et al. ..... 215/341
2004/0060893 A1 4/2004 Kano et al.
2004/0155007 A1 * 8/2004 Hearld et al. ..... 215/343
2004/0238478 A1 * 12/2004 Druitt et al. ..... 215/344
2005/0056613 A1 * 3/2005 King ..... B65D 41/045 215/330
2005/0189312 A1 * 9/2005 Bixler et al. ..... B65D 41/3428 215/252
2006/0138071 A1 * 6/2006 Tsutsumi ..... B65D 41/0421 215/252
2006/0163193 A1 * 7/2006 Smeyak et al. .... B65D 41/3409 215/344
2006/0207960 A1 * 9/2006 Bastero Lopez .. B65D 41/3409 215/331
2007/0125785 A1 * 6/2007 Robinson et al. ..... 220/351
2007/0131641 A1 6/2007 Higgins ..... B65D 41/0421 215/252
2008/0087625 A1 * 4/2008 Kumata et al. .... B65D 41/3428 215/252
2009/0159555 A1 * 6/2009 Druitt et al. ..... 215/344
2011/0000915 A1 * 1/2011 Kamath ..... B65D 1/0246 220/288

FOREIGN PATENT DOCUMENTS

CN 102015472 A 4/2011
EG 26024 A 12/2012
GB 1593072 A 7/1981
JP H 08503189 4/1996
JP H 09501636 2/1997
JP 2000085810 3/2000
JP 2000503944 4/2000
JP 2011-114313 4/2001
JP 2007514619 6/2007
MX 2010011796 4/2009
WO WO 9743190 11/1997
WO WO 01/15988 A1 3/2001
WO WO 0115988 3/2001

OTHER PUBLICATIONS

International Search Report and Written Opinion for corresponding PCT Application No. PCT/US2009/002632 dated Dec. 1, 2009 (8 pages).

* cited by examiner

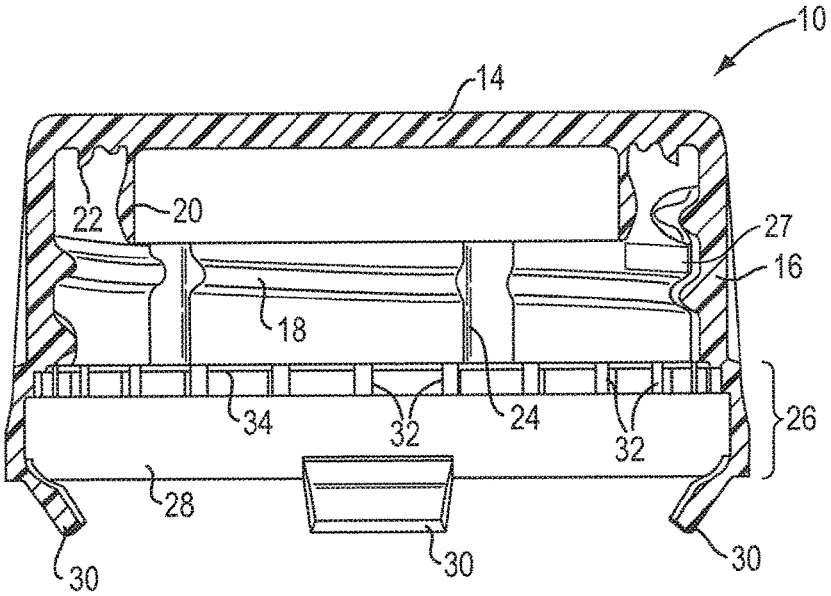
Amended FIG. 1
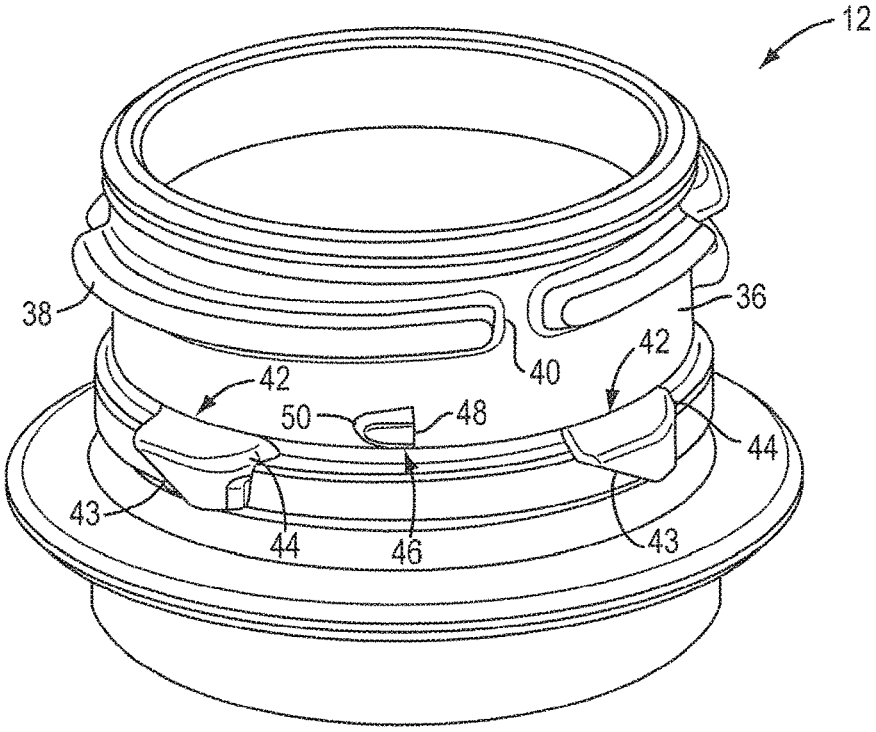
FIG. 2

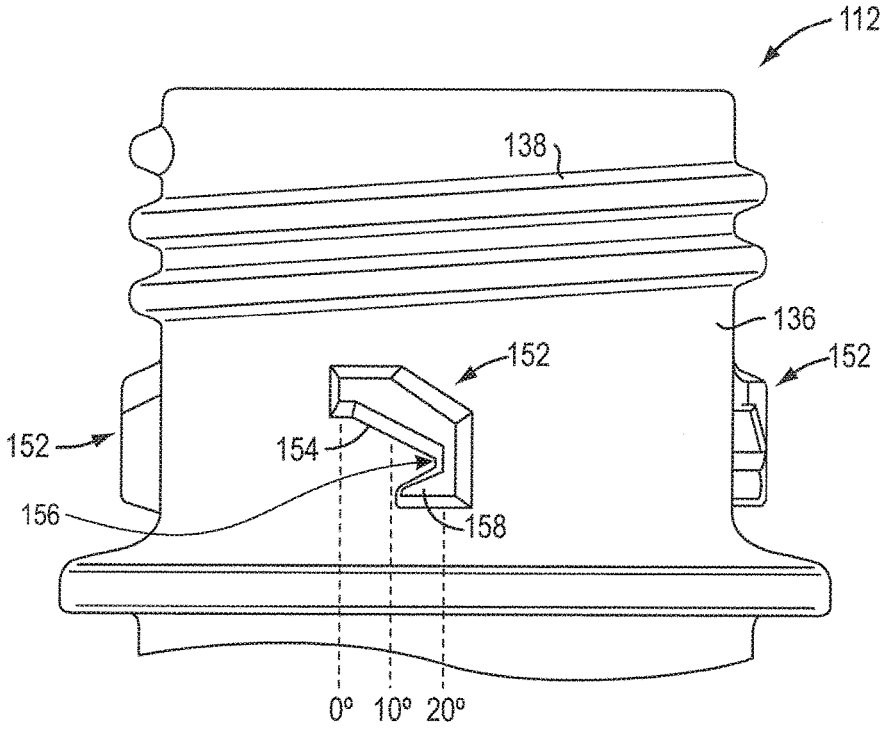
Amended FIG. 7

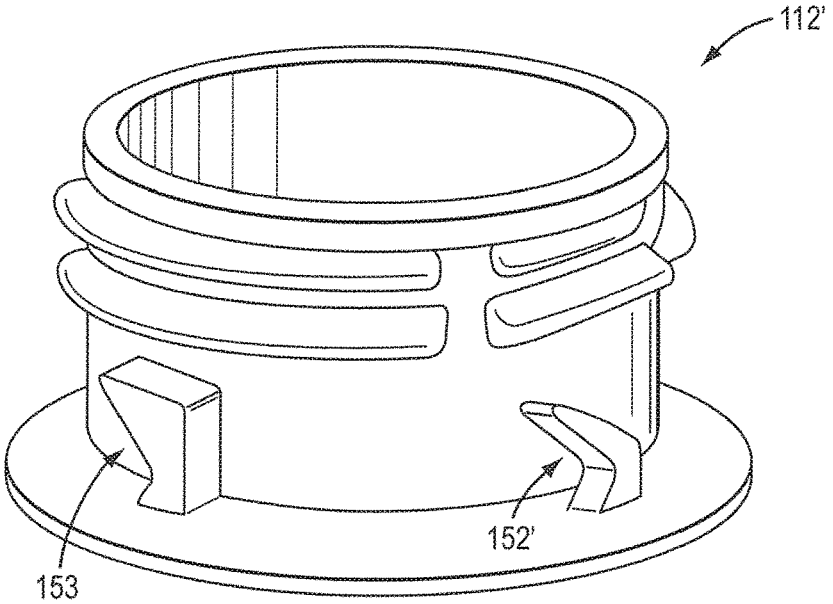
FIG. 11
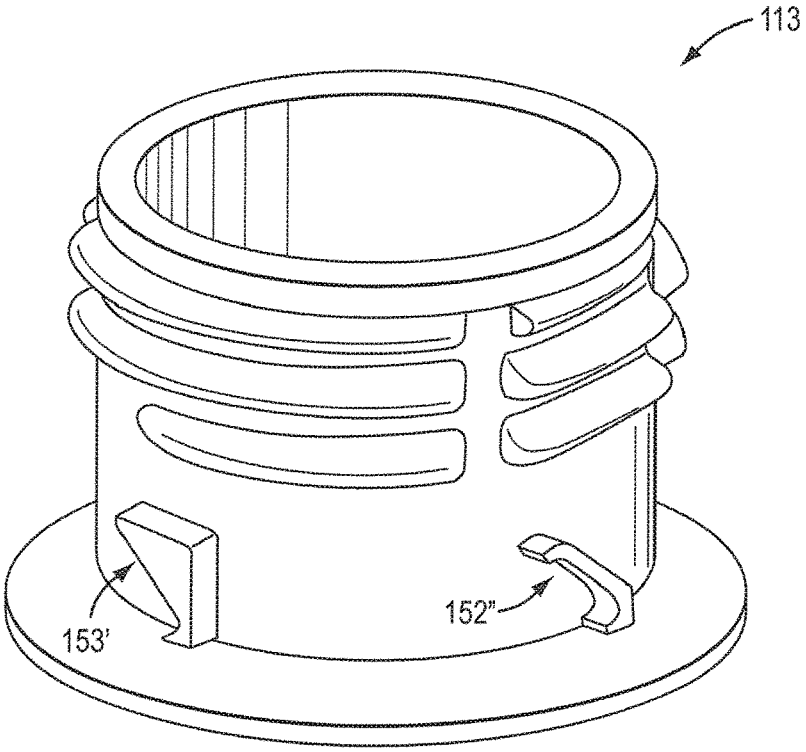
Amended FIG. 12

TAMPER-EVIDENT BOTTLE AND CLOSURE HAVING VENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a reissue of U.S. Pat. No. 8,807,360 issued on Aug. 19, 2014 from U.S. patent application Ser. No. 12/934,916 filed on Sep. 27, 2010; U.S. patent application Ser. No. 12/934,916 is a U.S. national phase of PCT Application No. PCT/US2009/002632, filed Apr. 30, 2009, PCT Application No. PCT/US2009/02632* claims the benefit of priority Provisional Application No. 61/125,981, filed Apr. 30, 2008, the disclosures of which are incorporated herein by reference.

TECHNICAL FIELD

The present invention relates generally to tamper-evident packages, such as comprising a container for beverages or like products, and an associated polymeric closure which cooperates with the container to provide improved opening performance. The present tamper-evident package is configured to provide a predetermined delay of tamper-evidence actuation upon initial opening movement of the closure, to thereby facilitate convenient opening of the package by consumers by isolating and separating events during closure removal which exhibit resistance to opening movement, thus desirably limiting peak torque requirements for closure removal. The present invention thus desirably limits inadvertent disengagement of a closure from the associated container, while enhancing convenient and comfortable closure removal for consumers. This invention addresses the proper magnitude and sequential placement of various features of the closure geometry to provide the most effective and comfortable design.

BACKGROUND OF THE INVENTION

Tamper-evident packaging, and in particular tamper-evident packages for beverages and like products, have met with widespread acceptance in the marketplace. Packages of this nature typically include a bottle or like container molded from polymeric material, and an associated closure, also molded from polymeric material, which cooperates with the container to provide secure and efficient sealing of the package contents. Tamper-evident closures, and associates package constructions, are disclosed in U.S. Pat. No. 4,938,370, No. 5,004,112, No. 5,167,335, No. 5,205,426, and No. 6,557,714, the disclosures of all of which are hereby incorporated by reference.

Notwithstanding the success of molded plastic closures such as configured in accordance with the above-referenced patents, there is currently a heightened awareness in the marketplace with respect to security of beverage packaging. As a result, there is a demand in the market for tamper-evident features, such as typically associated with commercial plastic beverage closure, which are configured such that the tamper-evident feature actuates before the package seal releases. Typical plastic closure beverage technologies available in the marketplace today do not necessarily meet this requirement. As a consequence, under some circumstances it is possible to release a package seal before actuating the associated tamper-evident feature.

Such as disclosed in the above-referenced patents, common tamper-evident technologies associated with plastic beverage closures and containers typically employ a tamper-evident band attached to the closure body via a frangible connection, typically comprising a plurality of circumferentially spaced, frangible bridges. In a typical construction, the tamper-evident band of a closure passes over a continuous locking ring on the container finish during initial application at the bottling line. Upon removal of the closure by the consumer, features on the tamper-evident band, such as disclosed in the above-referenced patents, engage the underside of the container locking ring, and axially retain the band on the bottle. As the consumer continues to rotate the closure to open the package, the frangible bridges are loaded in tension and break, separating the tamper-evident band from the body of the closure, and thus providing irreversible, visually discernible evidence that the package has been previously opened.

Specific characteristics of packaging technology, including plastic closures, have been the subject of careful study and evaluation. One performance aspect relates to the so-called Application Angle, that is, the rotational angle measured from the point at which a closure thread start first engages a bottle thread start during closure application. A target Application Angle, and angular tolerance range, are typically specified by closure manufacturers to ensure proper application of the closure on the bottle at the bottling plant. As can be appreciated, there is inevitably a statistical distribution associated with this angle. This distribution is referred to as the Application Angle Distribution.

Another performance characteristic of tamper-evident packages relates to the unscrewing angle at which the frangible bridges, connecting the tamper-evident band to the closure body, first break. Typically, a range of 50% to 75% bridge breakage is used as a performance standard, and is referred to as the Band Break Angle (BBA). This angle is measured in the unscrewing direction from the fully applied Application Angle. As will be recognized, there is also a statistical distribution associated with this angle. This distribution is called the BBA Distribution.

Another characteristic of this type of package is the unscrewing angle at which the package seal first releases, referred to as the Seal Release Angle (SRA). This angle is measured in the unscrewing direction from the fully applied Application Angle. Again, as will be appreciated, there is a statistical distribution associated with this angle. This distribution is referred to as the SRA Distribution.

The current requirement in the marketplace is that the statistical overlap of the BBA and the SRA distributions will result in a probability that is no greater than 20 to 200 in 10,000 that the BBA will exceed the SRA on any individual package.

Given these performance characteristics of tamper-evident packages, there are two basic approaches to achieving the requirement of breaking the tamper-evident band before the seal releases. The package designer can choose to reduce the average BBA, and associated BBA distribution, and/or, to increase the average SRA and associated SRA distribution. Increasing the average SRA typically results in the addition of extra material in the closure, which undesirably increases cost, and can also be undesirable with respect to opening of carbonated (pressurized) beverage packages. If the SRA is too long, there may not be sufficient time during package opening to release and vent gas pressure from within the package before disengagement of the closure and bottle threads, with the pressure acting against the closure to result in inadvertent displacement of the closure from the container. An efficient manner for achieving tamper-evident band breakage before seal release is to reduce the average BBA angle.

A preferred and viable method for significantly reducing the BBA is to immobilize the tamper-evident band with respect to rotation early in the opening movement of the closure. This can be accomplished by segmenting the locking ring on the closure (thus desirably reducing bottle weight for reduced cost), and providing features on the tamper-evident band that engage the segments on the bottle very early during closure removal. By configuring such bottle segments to include a lead-in angle, or ramped surface, on the application side of the bottle locking ring segments, undesired engagement and trapping of the tamper-band features during application is desirably avoided, avoiding premature fracture of the associated frangible bridges. By designing a blunt edge on the removal side of the locking ring segments, engagement and trapping of the tamper-band features during removal is ensured.

It should be noted that one undesirable aspect of this type of tamper-evident package is that the typical closure frangible bridges, that connect the tamper-evident band to the closure shell, fail and fracture more easily in tension loading than in shear loading. Once the tamper-evident band is prevented from rotating with respect to the closure shell, via engagement of the tamper-evident tabs with the blunt edges of the bottle locking ring segment, the frangible bridges are forced to fail primarily in shear, as a consequence further increasing the torque necessary to break the band, and as a result, the total torque necessary to open the package.

Ideally, the BBA should be as close to zero as possible to achieve a high level of BBA-less-than-SRA performance. However, placing the BBA at or very near zero requires that the consumer must not only overcome the opening torque associated with initially breaking the package seal interface, but must simultaneously overcome the opening torque necessary to break the frangible bridges holding the tamper-evident band to the closure shell. These additive torques results in total package opening torques that are very uncomfortable for the typical consumer, and that are significantly higher than the requirements currently specified by typical beverage producers.

The present invention is directed to embodiments of tamper-evident packages which have been specifically configured to provide enhanced opening performance, by isolating and separating the torque requirements which the package exhibits during initial opening, thereby facilitating convenient use by consumers, while still providing enhanced levels of tamper-evidence.

In accordance with the present invention, performance characteristics have been selected and provided to maximize Opening Torque Margin (OTM), maximize Tamper Evidence Margin (TEM), and maximize Auto-Release Margin (ARM).

SUMMARY OF THE INVENTION

In accordance with the present invention, a tamper-evident package includes a container having a neck portion defining an open mouth, and at least one external, helical thread formation thereon. The package further includes an associated closure having a top wall portion and a depending skirt portion having at least one internal, helical thread formation for mating, threaded engagement with a respective one of the external thread formations of the associated container.

The closure of the present package includes a sealing portion configured to sealingly engage the neck portion of the container when the closure is in a fully applied position on the container. The sealing portion may comprise an integral portion of the closure shell, such as a plug seal element depending integrally from the top wall portion of the closure, or may alternatively comprise a separate sealing liner positioned within the closure generally adjacent to the top wall portion thereof.

In accordance with the present invention, the sealing portion of the closure is configured to sealingly engage the neck portion of the container when the closure is in a fully applied position, with the package defining an angle A2, from the fully applied position, at which the sealing portion coacts with the container to create an Initial Unlock Torque, with the package further defining another angle A10 at which the sealing engagement between the sealing portion and the container is initially broken.

The present package includes pressurized gas, such as for carbonation of the container contents, and defines an angle A12, greater than angle A10, through which the closure is rotatably moved from the fully applied position, at which the gas pressure within the package is equal to the external atmosphere.

The closure of the present tamper-evident package further includes a tamper-evident band, connected to the skirt portion, for engagement with the package during removal of the closure from the container. The package defines a Band Break Angle (BBA) relative to the fully applied position of the closure, at which the tamper-evident band provides a predetermined level of visually discernable tamper-evidence. The closure further defines a Tamper-Evidence Resistive Torque created during rotation of the closure relative to the container attendant to the tamper-evident band providing the visually discernable tamper-evidence at the Band Break Angle.

The closure is movable on the container from the fully applied position for removal therefrom, with the closure exhibiting a Cumulative Removal Torque from the combined effects of the Initial Unlock Torque, the Tamper-Evident Resistive Torque, and any other resistive torque (such as created by the thread formations), which is no more than about a predetermined value of "x" inch pounds to maximize an Opening Torque Margin, with the difference between the Band Break Angle and the angle A10 being, on average, no less than about ø degrees to maximize a Tamper-Evident Margin, wherein "x" equals DK/0.066, and DK equals the external diameter of the outer gripping surface of the depending skirt portion, in inches.

In accordance with the present invention, the closure of the present package is rotatably movable relative to the container through an angle A9, greater than angle A12, at which angle A9 the internal and external thread formations are disengaged to permit removal of the closure from the container.

For certain applications, the closure of the present package can include one or more rotation-inhibiting projections, engageable with the container during removal of the closure therefrom. The rotation-inhibiting projections are configured and positioned so that a Projection Resistive Torque, created by the projections, combined with the initial Unlock Torque and the Tamper-Evidence Resistive Torque does not result in the Cumulative Removal Torque exceeding the stated predetermined value.

The rotation-inhibiting projections of the closure can be configured and positioned so that a Projection Resistive Torque, created by the projections, is created after rotatable movement of the closure on the container through said Band Break Angle, and before the angle A12.

Because the present package includes pressurized gas, the rotation-inhibiting projections can be configured and positioned to create the Projection Resistive Torque for the closure through an angle of removal between the angle A10 and the angle A12 which is greater than any removal force exerted on the closure by gas pressure within the package to thereby create an Auto-Release Margin (ARM).

The rotation-inhibiting projections can be configured and positioned on the closure to create a sufficient Projection Resistive Torque at an angle greater than the angle A1, and to create a sufficient Projection Resistive Torque at an angle greater than said Band Break Angle.

To facilitate release of gas pressure from within the present package, at least one of the container and the closure of the package defines vent grooves traversing the respective one of the thread formations, to thereby facilitate release of gas pressure from within the container prior to disengagement of the respective thread formations during removal of the closure from the container. The vent grooves are positioned to maximize gas flow from within the package when the closure reaches the angle A10.

The container of the package can be configured to define a plurality of circumferentially spaced vent grooves traversing the external thread formation thereof to facilitate venting of gas pressure from within the package attendant to removal of the closure from the container. The rotation-inhibiting projections of the closure are positioned on the closure to minimize simultaneous disposition of the projections in respective ones of the container vent grooves.

In accordance with the present invention, the closure of the present package includes a tamper-evident band, connected by a frangible connection to the skirt portion of the closure. The tamper-evident band is configured for cooperating engagement with the container during removal of the closure from the container, to thereby fracture the frangible connection of the tamper-evident band, providing readily visually discernible evidence that the package has been opened.

In the illustrated embodiments, the tamper-evident band of the closure includes a plurality of circumferentially spaced, inwardly extending flexible projections which are configured to coact with the associated container for effecting the desired fracture of the frangible connection, typically provided in the form of a plurality of circumferentially spaced, frangible bridges.

Notably, the present tamper-evident package is configured such that during opening movement of the closure during removal, the closure moves through a predetermined angle from the fully applied position of the closure, prior to actuation of the tamper-evident band for fracture of the frangible connection to the associated skirt portion of the closure. By this arrangement, the torque required for moving the closure from its fully applied position is separated from the torque required for actuating the tamper-evident feature, thus facilitating convenient opening by consumers, but with the package configured such that the tamper-evident feature is actuated prior to release of the sealing portion of the closure from the container.

To rotationally immobilize the tamper-evident band of the closure, a segmented locking ring is provided on the container finish, which in the illustrated embodiment is comprised as a plurality of circumferentially locking elements in the form of spaced projections which extend outwardly from the neck portion of the container, apart from any annular locking ring or like feature. The edges of the locking ring segments or projections that engage the flexible tabs of the tamper-evident band during closure application preferably incorporate a lead-in angle or ramped surface that allows the locking tabs on the tamper-evident band to easily slip over the segments, without immobilizing the band.

The edges of the locking ring segments that engage the tamper-evident band tabs during closure removal are provided with blunt edges, or other geometries, that act to trap and retain the tabs during closure removal, thereby quickly rotationally immobilizing the tamper-evident band. As will be appreciated, the closure tamper-evident band is designed with locking tabs, or other features, which are specifically configured to engage the removal side of the locking ring segments, and quickly rotationally immobilize the tamper-evident band during removal by the consumer. In alternate embodiments, it is not necessary to totally immobilize the tamper band. In these embodiments, the locking tabs or other features are designed to coact with the container features such as locking ring segments to provide a resistive force that acts to significantly slow the rotation of tamper band relative to the closure shell.

Empirical testing has shown that it takes approximately 5 to 20 degrees of opening rotation to initially break the static coefficient of friction at a typical closure/bottle sealing interface. As will be recognized, this does not mean that the seal will be unsealed, and leak, after 5 to 20 degrees of rotation, but only that the seal technology transforms from a static seal, with a high coefficient of friction, to a dynamic seal, with a significantly lower coefficient of friction.

To avoid the problem of the additive effect of the static seal break torque and the band break torque, the present invention contemplates delaying the band break event by the predetermined angle, preferably in a range of about 5 to 20 degrees, and more preferably about 15 degrees. Thus, during opening movement, a consumer will first experience the torque necessary to release the static seal, and then directly after this event, will experience the torque necessary to break the frangible bridges on the tamper-evident band. By delaying the BBA by minimally about 10 to 20 degrees, and preferably about 15 degrees, of opening rotation, the consumer desirably will not experience the additive effect of these two events, and will therefore find the total torque required to open the package to be well within acceptable limits.

In the illustrated embodiments of the present invention, the tamper band is provided with a plurality of inwardly extending, flexible projections or tabs, each movable about a respective generally horizontal hinge axis. During closure application, these tabs are urged upwardly as they engage the container finish, with the locking ring segments or projections on the associated container configured to deflect the tamper-evident band projections so as to avoid excessive loading of the associated frangible bridges.

In one illustrated embodiment, the closure of the package includes at least one stop surface engageable by the closure during application of the closure to the container. The stop surface limits further rotational movement of the closure onto the container beyond the fully applied position on the container.

The stop surface is positioned on the container so that during initial movement of the closure from the fully applied position for removal of the closure an opening of the package, the tamper-evident band does not engage the locking ring segments or projections until opening movement of the closure through the predetermined angle. The stop surface can be positioned on the container for engagement with one of the internal thread formations on the associated closure, and can be configured to define a generally radially oriented stop surface for engagement with the internal thread formation on the closure. In one embodiment, a stop surface is provided by one or more of the segmented locking elements on the containers.

In one illustrated form, a stop element defines a stop surface engageable by the closure as it moves to its fully applied position, with the stop element further defining an inclined guide surface spaced from the stop surface. In this form of the present invention, the projections of the tamper-evident band are positioned relative to the thread start of the closure, or other feature which engages the container stop element, so that the tamper-evident tabs are positioned in a predetermined relationship relative to the stop surface, and thus the locking ring segments or projections. As will be appreciated, "timed" actuation of the tamper-evident feature is thus effected, as the closure is moved from its fully applied position to the desired predetermined angle.

In another illustrated embodiment, the tamper-evident band of the closure of the package includes a plurality of circumferentially spaced, inwardly extending flexible projections, each movable about a respective, generally horizontal axis. In this embodiment, the container of the package includes a segmented locking ring including a plurality of circumferentially locking elements in the form of spaced segments or projections which are specifically configured to coact with the tabs of the tamper-evident band to provide the desired timed actuation of the tamper-evident feature, relative to movement of the closure from its fully applied position on the container.

In this embodiment, the circumferentially spaced locking ring segments are configured as a plurality of circumferentially spaced locking elements configured for cooperation with the tamper-evident band during removal of the closure from the container, for thereby fracturing the frangible connection between the tamper-evident band and the associated skirt portion. Each locking element defines a lower retention surface, including an inclined guide surface terminating in a downwardly extending stop surface. The inwardly extending projections on the tamper-evident band of the closure are positioned and configured so that at least one of the projections is disposed between adjacent ones of the locking elements on the container, when the closure is in its fully applied position. By this arrangement, one of the tamper-evident band projections is engageable with a respective one of the stop surfaces of the locking elements during opening movement of the closure from its fully applied position. The closure is movable through the predetermined angle, greater than Angle A1, prior to engagement of the projection with the respective one of the stop surfaces, thereby fracturing the frangible connection.

Preferably, the guide surface of each of the locking elements on the container subtends an arc at least as large as the predetermined angle through which the closure moves from its fully position prior to tamper-evident band actuation. As illustrated, the stop surface can be generally vertically oriented. In accordance with illustrated embodiments, the lower retention surface of each locking element on the container can be configured to further define a locking notch at the stop surface thereof, for receiving a respective one of the projections on the tamper-evident band.

Cooperation between the ba band on the closure and the locking elements of the container is facilitated by configuring each of the tamper-band projections to have a length generally equal to a distance between an inwardly facing surface of the tamper-evident band, and an outwardly facing surface of the container between adjacent ones of the locking elements.

In a further illustrated embodiment of the present tamper-evident package, the tamper-evident band of the closure includes an annular band portion, and a plurality of circumferentially spaced, inwardly extending flexible projections, with each projection being hingedly connected at a lower portion thereof to the band portion. Notably, each projection includes a relatively flexible extension element projecting from an inner, free edge portion of the projection.

In this embodiment, the container includes a segmented locking ring, comprising a plurality of circumferentially spaced, locking elements configured for cooperation with the tamper-evident band of the closure during removal of the closure from the container, thereby fracturing the frangible connection with the associated skirt portion. Each locking element defines a lower, generally horizontal guide surface, and an inclined retention surface terminating at and extending at an angle downwardly from the respective guide surface.

The inwardly extending projections of the tamper-evident band are positioned and configured so that at least one of the projections is disposed between adjacent ones of the locking elements on the container when the closure is in its fully applied position. The extension element on each projection cooperates with the locking elements on the container to prevent at least a further one of the projections from being positioned in association with the locking elements, so that the further projection is not engageable with the retention surface of the respective locking element. In this fashion, one or more of the projections on the tamper-evident band are prevented from tamper-evident actuation with the locking elements until the closure has been moved through the predetermined angle from its fully applied position.

Thus, the extension element of each of the projections is engageable with the guide surface of a respective one of the locking elements during opening movement from the fully applied position, with the closure thus being movable through the predetermined angle prior to engagement of said one projection with the inclined retention surface of the respective one of the locking elements for fracturing the frangible connection.

To provide the desired predetermined angular movement from the fully applied position, the guide surface of each of the locking elements subtends an arc at least as large as the predetermined angle. The extension element of each of the projections has a thickness less than an adjacent free edge of the projection, with the extension element of each projection optionally having an inwardly tapering configuration in a direction away from the adjacent free edge portion of the projection.

In one form, each of the tamper-evident band projections defines a recess in the free edge portion thereof, generally adjacent to the extension element thereof, into which the extension element can be moved or deflected when that one of the projections engages the guide surface of an associated one of the locking elements during movement of the closure from the fully applied position. In another embodiment, the extension element is deflected and folded outwardly attendant to engagement with a guide surface of a respective container locking element. Thus, the extension element is deflected by the guide surface of the associated locking element, permitting movement of the closure through the desired predetermined angle, before that projection engages the inclined retention surface of the locking element for effecting tamper-evidence.

To provide the desired cooperation between the band projections and the container locking elements, the projections on the tamper-evident band each have a length greater than the distance between an inwardly facing surface of the band portion of the tamper-evident band, and an outwardly facing surface of the container between adjacent ones of the locking elements.

Other features and advantages of the present invention will become readily apparent from the following detailed description, the accompanying drawings, and the appended claims.

BRIEF DESCRIPTION OF THE DRAWINGS

FIG. 1 is a diagrammatic view of a tamper-evident closure of a tamper-evident package embodying the principles of the present invention;

FIG. 2 is a diagrammatic view of a container of the present tamper-evident package, configured for cooperation with the closure of FIG. 1;

FIG. 7 is a diagrammatic illustration of a container of an alternate embodiment of the present tamper-evident package;

FIGS. 10, 11, 12, and 12a are diagrammatic views of alternative embodiments of the container illustrated in [0002] FIG. 10 for this embodiment of the present tamper-evident package;

DETAILED DESCRIPTION

Figure 3:
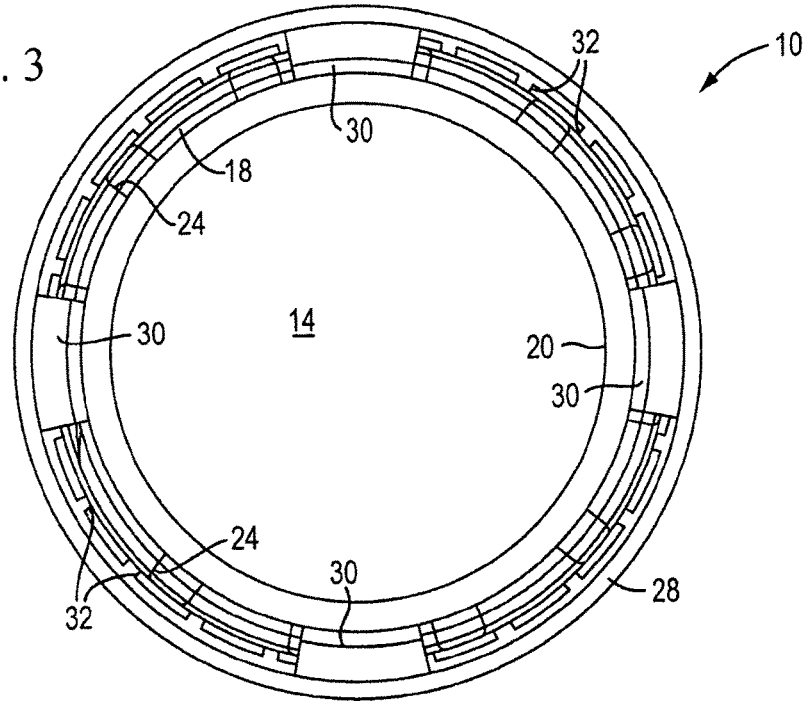
FIG. 3 is a bottom plan view of the closure illustrated in FIG. 1.

While the present invention is susceptible of embodiment in various forms, there is shown in the drawings, and will hereinafter be described, presently preferred embodiments, with the understanding that the present disclosure is to be considered as an exemplification of the invention, and is not intended to limit the invention to the specific embodiments illustrated.

As discussed hereinabove, the present invention is directed to a tamper-evident package which is configured to provide reliable and secure tamper-evidence, while facilitating convenient use by consumers, in particular, convenient opening of the package by removal of a package closure from the associated container during initial opening of the package. Notably, the present tamper-evident package is configured to immobilize or significantly retard the rotation of a tamper-evident band of the closure of the package with respect to initial opening movement of the closure for opening of the package. Embodiments of the present invention are configured to permit opening movement of the closure, from a fully applied position on the associated container, through a predetermined angle prior to actuation of the tamper-evident band of the closure for tamper-indication. This desirably acts to isolate the static friction associated with initial movement of a sealing portion of the closure out of sealing engagement with the associated container, from the tamper-actuation event. The torque requirements experienced by consumers during opening movement are thus desirably isolated and separated, facilitating ease of closure removal. At the same time, the present tamper-evident package is configured so as to desirably provide tamper-indication prior to release of the associated sealing interface, thus desirably providing a high level of security for the contents of the package.

Figure 18:
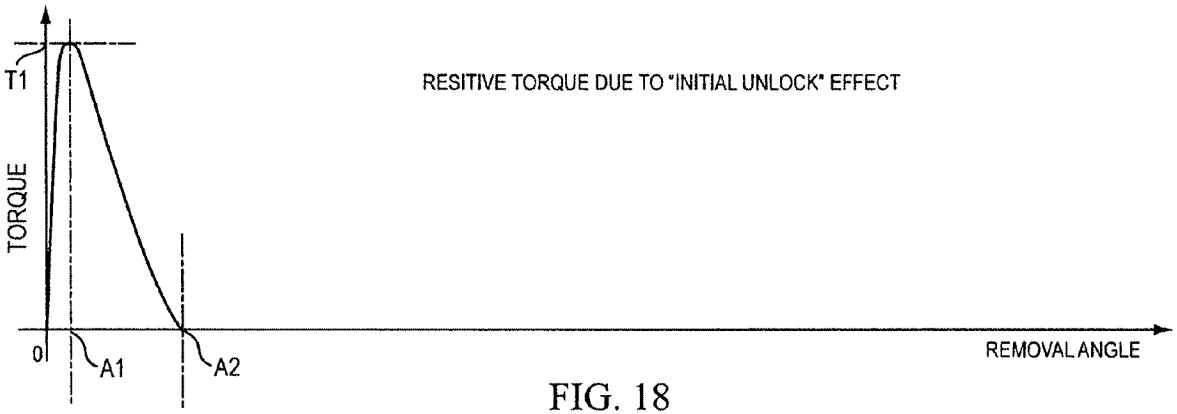
FIGS. 18 to 26 are graphical representations of performance characteristics of the present tamper-evident package, showing such characteristics in relationship to the removal angle of a closure of the package from an associated container.

FIG. 18 shows the torque required to initially rotate the closure against the bottle. Fully closed is to the left at "0" and fully open is to the right. This torque is due primarily to the friction at the seal (seal of the closure against the finish of bottle) and at the threads (thread of closure against thread of bottle finish). To a minor extent, and only in cases of rigid or brittle plastic or metal, this torque event is due also to static friction release or "stiction". In softer material the static friction phenomenon does not appear. Angle A1 is the removal angle at which the torque reaches the peak (T1). In metal-to-metal contact this angle would be "0". In softer material, the angle is small, but non-zero. Angle A2 is the position at which the seal no longer pulls the closure against the threads. Other sources of friction will remain, however.

Figure 19:
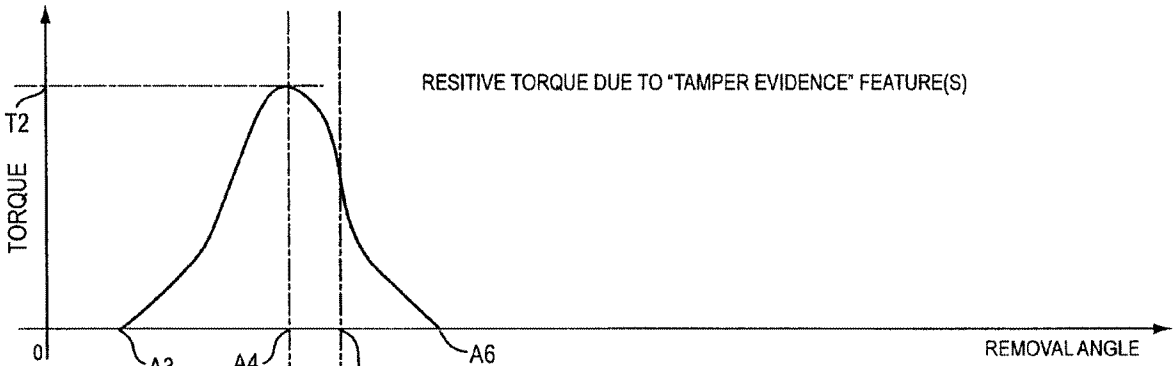

FIG. 19 shows the build up and decay of the torque required to activate some form of tamper evident (TE) feature. This TE mechanism is often (but not limited to) a frangible band. Angle A3 indicates the initial contact of the TE feature. Angle A4 defines the maximum torque (T2). Angle A5 is the angle at which the tamper evident feature has been activated be definition. In the case of a frangible band this is known as the "Band Break Angle" (BBA). An example of this is 75% of the "leaders" which attach the band to the closure sidewall would be broken. Angle A6 is the highest angle at which this feature contributes to the overall torque.

Figure 20:
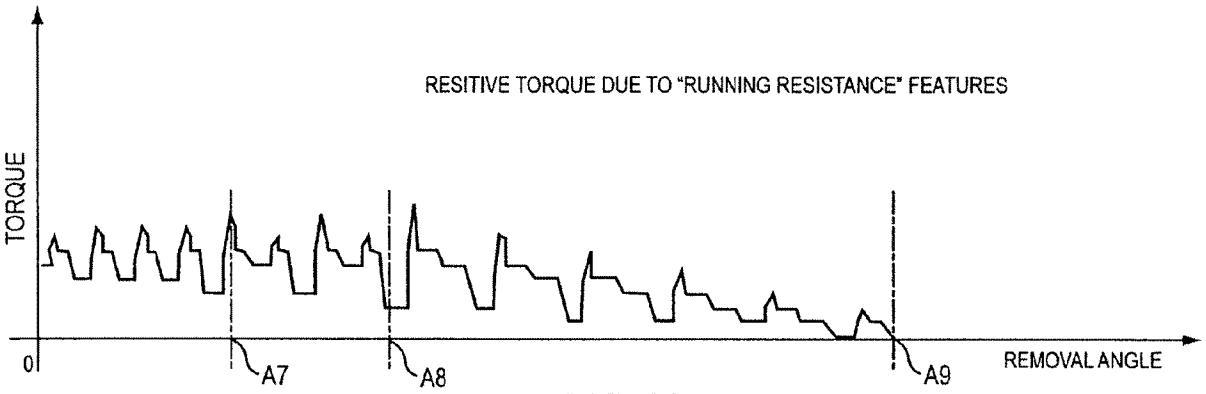

FIG. 20 shows the torque contributed by a typical resistance feature that contacts the crown of the bottle finish threads, commonly called speed bumps. Angle A7 is one of several positions at which multiple resistance features are starting to engage the thread segments. Angle A8 is one of several positions at which many resistance features fall into bottle finish vent slots or thread interruptions. Angle A9 represents the angle at which the closure is totally released from the bottle finish.

Figure 21:
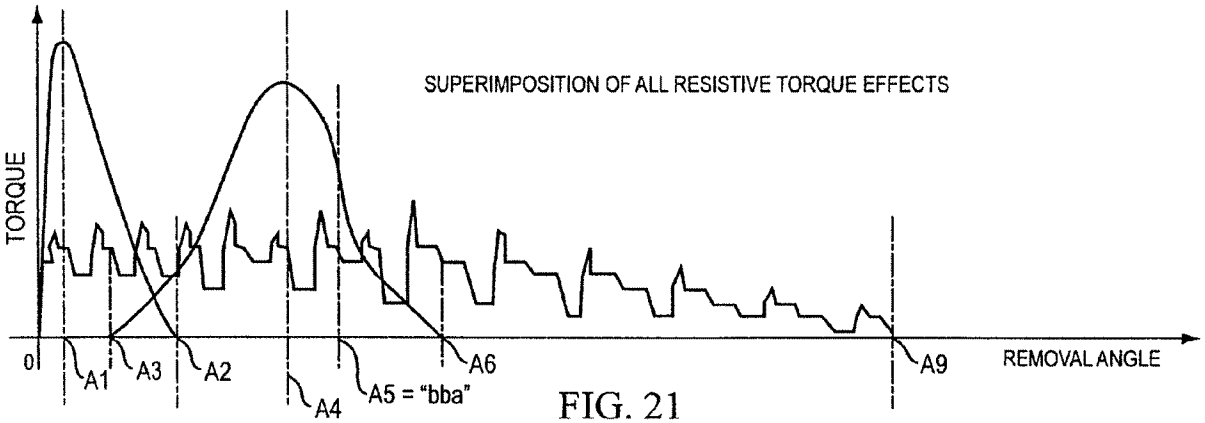

FIG. 21 shows all of the above torque generating curves superimposed but not added together.

Figure 22:
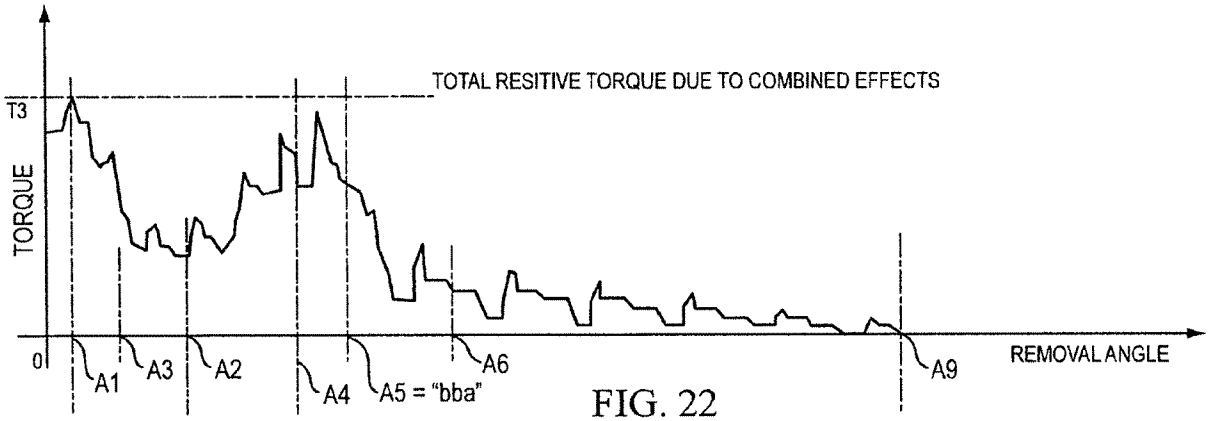

FIG. 22 shows all of the above torque generating curves added together as would be the case in a typical applied closure.

Figure 23:
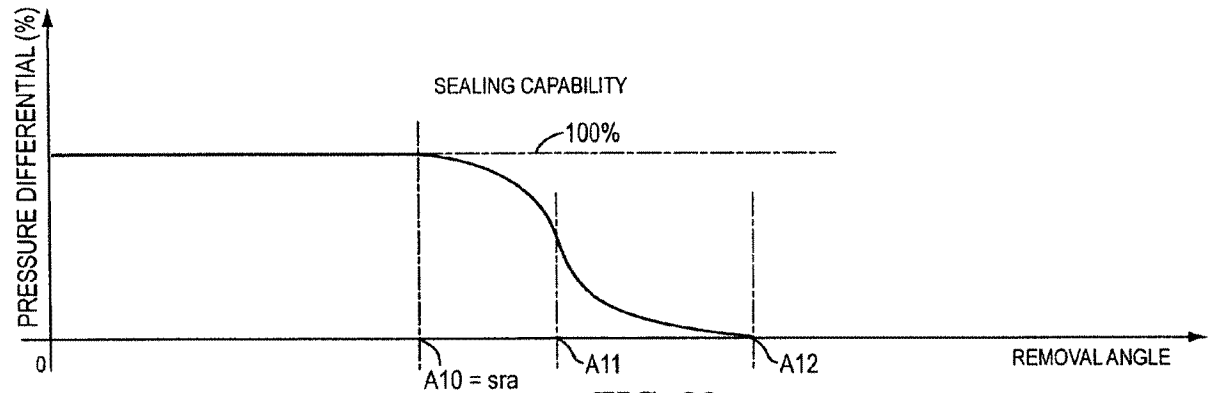

FIG. 23 shows the pressure sealing capability as it changes with removal angle. Angle A10 represents the position at first leakage. Angle A12 is the position at which all of the gas pressure has escaped and the interior of the bottle and the external atmosphere are at the same pressure. Angle 11 is used in later discussions.

Figure 24:
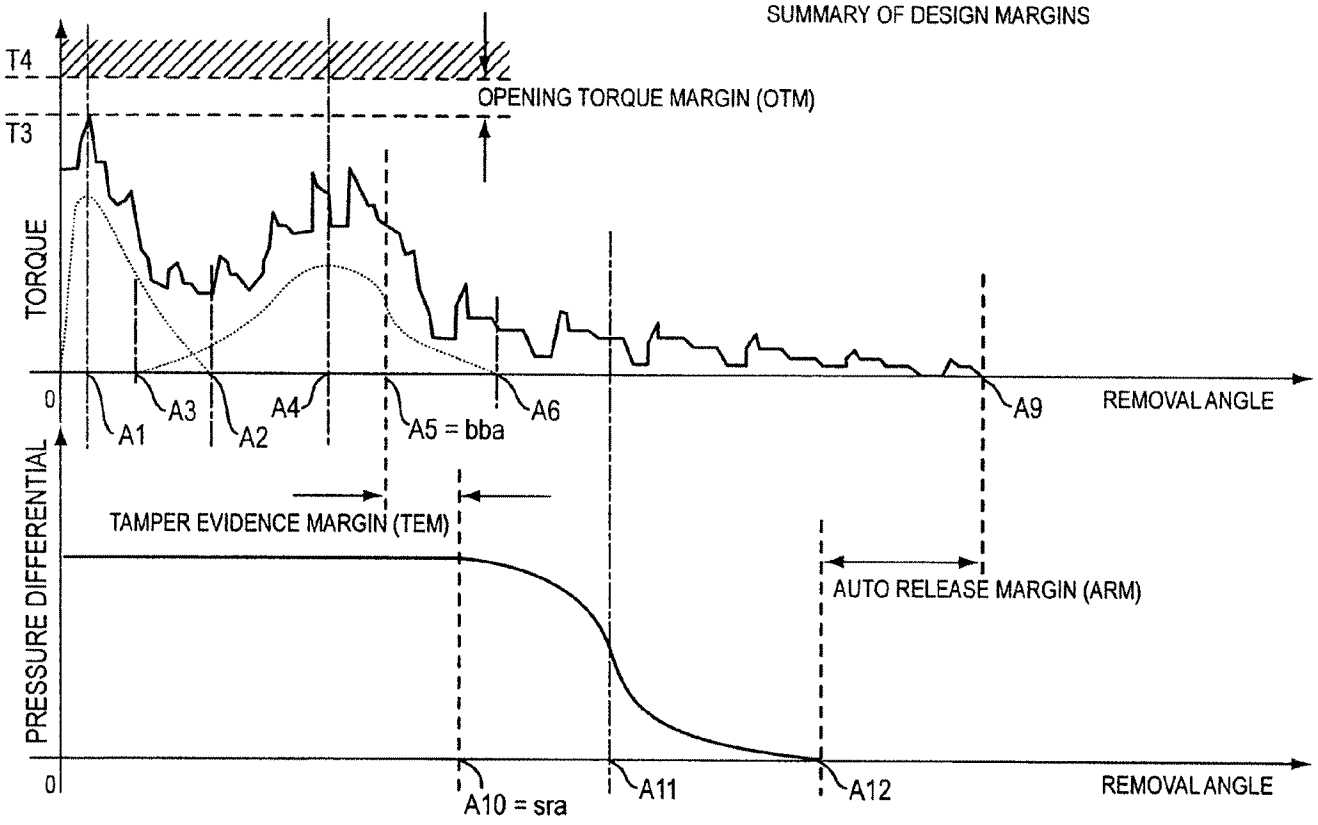

FIG. 24 shows all of the relevant angles and torques used to quantify the suitability of a design. The torque value, T4, is the maximum allowed removal torque allowed. T4 minus T3 is the Opening Torque Margin (OTM) of safety. Angle A10 (SRA) minus angle A5 (BBA) is the Tamper Evidence Margin (TEM) of safety. Angle A9 minus angle A12 is the Auto Release Margin (ARM) of safety.

Figure 25:
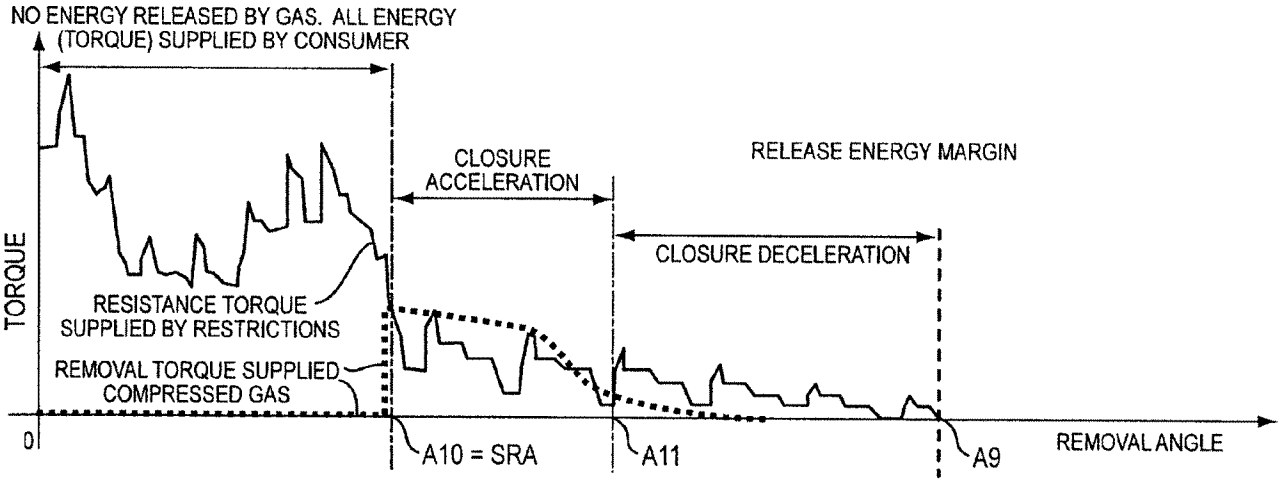
Figure 26:
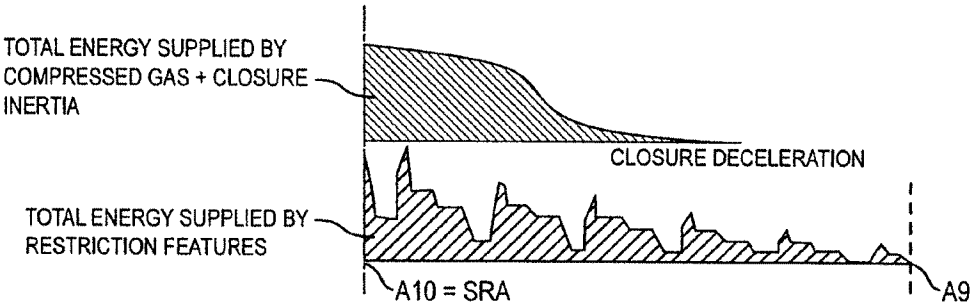

FIG. 25 shows the Release Energy Margin (REM) to minimize instrument closure release. The REM is the difference between the energy at any angle (A11) contained in the bottle by the compressed gas plus the inertial energy of the spinning closure compared to the energy that can be absorbed by the resistance features from angle A10 to the end (angle A9). If the energy in the bottle and closure is greater than can be absorbed by the remaining resistance, then the closure will auto-release by spinning off axially. However, if the resistance features and threads have enough resistance to absorb the remaining energy at any angle (A11) from 0 to A9, then the closure design desirably avoids inadvertent release.

The most straightforward method of maximizing the OTM (opening torque margin) conflicts with maximizing both the TEM (tamper evidence margin) and the ARM (auto-release margin). The most logical approach to maximizing the OTM is to reduce the TE torque and separate the two peaks by sliding the TE feature timing to the right (later, higher angle), thus reducing or eliminating the overlap. This movement of the TE timing directly reduces the TEM unless the seal is held longer (higher angle). However, increasing the seal timing reduces the ARM.

One part of the solution is to reduce the running resistance at the lower angles and increase it at the higher angles. Reducing the running resistance at the lower angles adds less to the total torque at the maximum point. Increasing the running resistance at the higher angles provides more resistive work to absorb the energy of escaping gas after the seal is breached.

Another improvement technique is to reduce the time to vent (angle A10 to A12). The venting angle can be reduced by maximizing the vent flow of the design. Note that the vent flow capability prior to (at lower angles than) angle A10 is irrelevant since no gas flows at these angles.

Contrary to the most straightforward method mentioned above, an improvement in increasing all margins simultaneously can be accomplished by narrowing the tamper evident event and shifting it to the left (sooner, lower angles). Obviously, reducing the peak TE torque is also directly effective.

One effective method of providing running resistance is by using features in the closure which interfere with (rub on) the crown of the thread of the bottle finish commonly called "speed bumps". By innovative placement of these speed bumps, the torque "schedule" can be controlled. One method of reducing the peak and variability of the running torque is to use a quantity and placement of speed bump features that does not allow multiple speed bumps to fall into multiple vent slots (in the finish) simultaneously.

A poor design that leads to "ratcheting", as shown in FIG. 20, (the feel of radical and sudden changes in torque) is to use the same number of speed bumps as vent slots and spacing the speed bumps at the same spacing as the vents. 6 speed bumps placed at 60 degrees apart on a similarly spaced bottle finish vent pattern is an example. In this way, all speed bumps drop into all vents at the same angle (angle A8 in FIG. 20) and produce the minimum torque, immediately followed by all speed bumps hitting the ends of the thread segments (angle A7 in FIG. 20), creating the maximum torque. This design is not desirable also because all of the speed bumps provide restrictions to venting when they are in the vent slots.

A better design would be 5 or 7 speed bumps placed in such a manner that only one would fall into a vent slot at a time.

Additional improvement can be gained by grouping the speed bumps (or any other restrictions) toward the open end of the closure, rather than at the closed end (bottom of the closure). The restrictions at the open end of the closure provide drag during the entire removal process, whereas the restrictions toward the closed end are only effective during the beginning of the removal which is where drag is not required or desired. Notice that in FIG. 20 the running resistance decreases toward the higher removal angles. This reduction is due to the reduction in the number of restrictions (speed bumps) that are in contact with the finish as the closure nears the full open position (angle A9).

A further improvement can be made by placing one or more resistance features so close to the open end of the closure thread that they do not contact the finish thread until after a few degrees of rotation, thereby producing no torque that could add to the initial removal torque requirement.

This design improvement involves making the venting geometry the most efficient at the optimum time. Interaction of the closure vents and finish vents is irrelevant prior to the seal release. So, at the angles near the seal release position (angle A10 in FIG. 23), the venting gas should be permitted to escape as rapidly as possible. In addition, the escaping gas should not produce a thrust in the direction of opening. Traditionally the gas has two paths between the closure and finish seal surface and the atmosphere. These two paths are vertically down through the vent slots and spiraling around between the threads. The gas that spirals between the threads tends to provide a jet of gas in the removal direction and also carries gas and moisture which greatly reduces the coefficient of friction between the threads. Both of these gas-in-thread effects are detrimental to removal safety.

The improved design will have maximum vent alignment near the seal release angle (SRA) and will restrict airflow spiraling between the threads or even be directed in the opposite direction to removal Narrowing the angle at which it takes to actuate the tamper evident feature has several advantages. A narrow or sudden actuation provides a more positive indication to the consumer that the event has taken place, and the reduction in area under the curve, particularly at the angles which overlap the "initial unlock torque", directly reduces the torque required by the consumer. In an optimum design, it is not necessary to reduce the peak torque (T2 in FIG. 19) of the TE event, but only to not add the TE torque to the Initial Unlock torque. In some cases the TE torque is one of the indicators that the consumer needs to feel to be assured of breaking a frangible TE band for example. The peak TE torque has to be within an acceptable level and away from both the initial unlock event (angle A2 in FIG. 18) and the seal release angle (SRA) (angle A10 in FIG. 23). In designs in which the TE feature is a frangible band, there are criteria for the desired margin between what is considered the band break angle BBA and the seal release angle SRA.

A first illustrated embodiment of the present invention desirably acts to limit the so-called Application Angle of the package closure to a relatively narrow distribution, that is, Application Angle Distribution (AAD). The typical variability associated with the Application Angle Distribution is primarily due to dimensional differences between the closure and the container finish, variability in the static torque associated with the capping heads, line speed and associated rpm of the capping heads, softness and thickness of the closure liner material, temperature of closures and containers at time of application, and like variable parameters. Due to the excessive variability typically associated with the Application Angle Distribution, the fully applied position of locking tabs or other features on a closure tamper-evident band, relative to locking ring segments or like blocking elements, on the finish of the associated container is essentially random. It has thus been recognized that if the Application Angle can be controlled more consistently, that is, greatly reduce the variability of the Application Angle Distribution, the tamper-evident locking tabs can be rotationally positioned relative to a start of the closure thread such that the tabs would never engage the locking elements of the bottle finish prior to movement from a fully applied position to a predetermined angle, such as in the range of about 5 to 20 degrees, and more preferably about 15 degrees, of initial unscrewing rotation.

To this end, the embodiment of the present package illustrated in FIGS. 1-5 includes a "stop feature", which provides cooperation between the closure and the container such that this feature is engaged during closure application, and desirably acts to limit closure rotation to a very narrow window of Application Angle. This embodiment of the present invention includes a stop surface, engaged by the closure during application to a fully applied position, whereby the closure is movable through the desired predetermined angle, from the fully applied position, before actuation of the associated tamper-evident feature. In one illustrated embodiment, the stop surface is provided by a stop element on the container finish, and is positioned for engagement with a closure thread formation, which during application, engages the stop element, thereby absorbing rotational energy associated with the capping process, and thus stopping the closure application rotation at a predetermined, and narrowly distributed angle. As will be recognized, the specific configuration of the stop element can be varied while keeping with the principles disclosed herein.

With reference to FIG. 1, therein is illustrated a tamper-evident closure 10 configured for sealing cooperation with an associated container 12, which together provide a tamper-evident package embodying the principles of the present invention. Closure 10, which can be efficiently molded from polymeric materials, such as polypropylene, polyethylene, co-polymers, etc., by compression or injection molding techniques, includes a circular top wall portion 14, and a depending, cylindrical skirt portion 16, having at least one internal thread formation 18. Closure 10 includes a sealing portion configured for sealing cooperation with the associated container 12, which in the illustrated embodiment includes an integral plug seal element 20 depending from the top wall portion 14, which may optionally include one or more additional annular sealing elements, such as illustrated at 22. The closure preferably includes one or more axially extending vent grooves 24, traversing thread formation 18, which facilitates release of gas pressure from within an associated container having carbonated or otherwise pressurized contents. *FIG. 1 also depicts one of the rotation-inhibiting projections 27.*

Closure 10 is configured for tamper-indication by the provision of a tamper-evident band 26 depending from skirt portion 14, and connected thereto by a suitable frangible connection. Tamper-evident band 16 includes an annular band portion 28, and a plurality of inwardly extending, relatively flexible projections 30, each hingedly connected to an edge portion thereof to annular band portion 28 for movement about a respective horizontal axis. In this illustrated embodiment, closure 10 includes four, evenly circumferentially spaced flexible projections, or tabs, 30.

The desired frangible connection between the tamper-evident band 26 and the skirt portion 16 of the closure 10 is provided by a plurality of circumferentially spaced, frangible bridges 32 which extend integrally between band portion 28 and skirt portion 16. In a preferred form, frangible bridges 32 are molded integrally with the band portion 28 and the skirt portion 26, with the closure thereafter scored, at score line 34, to thereby distinguish the band portion from the skirt portion, and to cut and score each of the frangible bridges 32 so that each bridge defines a frangible, residual portion. Alternatively, inwardly extending, non-flexible projections such as "nibs" can be used instead of hingedly connected tabs.

Figure 4:
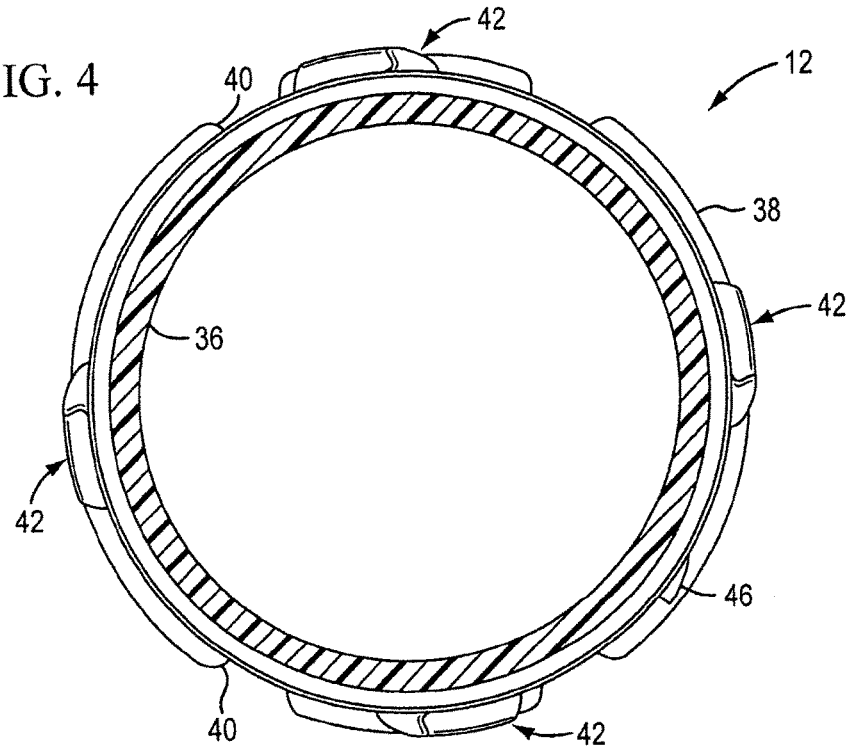
FIG. 4 is a cross-sectional view of the container illustrated in FIG. 2.
Figure 5:
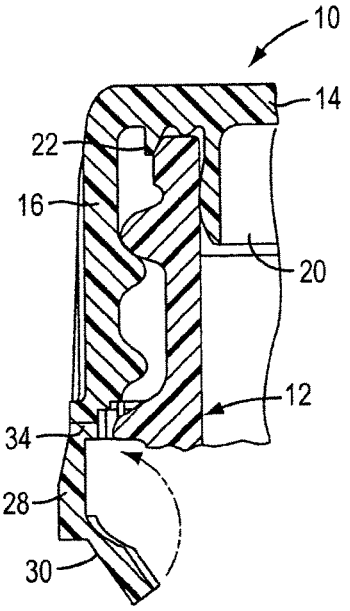
FIG. 5 is a fragmentary, diagrammatic view illustrating the present tamper-evident package, including the closure of FIG. 1, and the container of FIG. 2.

With particular reference to FIGS. 2 and 4, container 12 illustrated therein includes a neck portion 36 defining an open mouth of the container, and at least one external, helical thread formation 38 configured for cooperating and mating, threaded engagement with internal thread formation 18 of closure 10. Container 12 may also be configured to define vent passages 40, traversing the thread formation 38, to facilitate release of gas pressure from within the associated container during closure removal.

In this embodiment of the present tamper-evident package, container 12 includes a plurality of circumferentially spaced, outwardly extending locking elements 42, sometimes referred to as segments or projections of a segmented locking ring. Each of the locking elements 42 includes an inclined retention surface 43 against which a respective one of the projections 30 of tamper-evident band 26 coact and engage during closure removal for effecting fracture of frangible bridges 32. Each of the locking elements 42 preferably includes a guide surface 44, positioned generally opposite retention surface 43. Each guide surface 44 can be engaged by one or more of the flexible projections 30 of the tamper-evident band 26 during closure application, thereby urging the projections 30 upwardly and outwardly toward band portion 28, while avoiding fracture of frangible bridges 32 during closure application.

In this embodiment of the present tamper-evident package, container 12 is provided with a stop element 46, engageable by closure 10 during application when the closure is moved to its fully applied position on the container. In the illustrated form, stop element 46 is positioned and configured for engagement by the start of closure thread formation 18, but as will be recognized, the stop element on the container, and associated cooperating feature on the closure, can be otherwise configured.

As shown, stop element 46 includes a radially oriented stop surface 48 engaged by the thread formation 18 of the closure, and an inclined guide surface 50, spaced from the stop surface 48.

Figure 6:
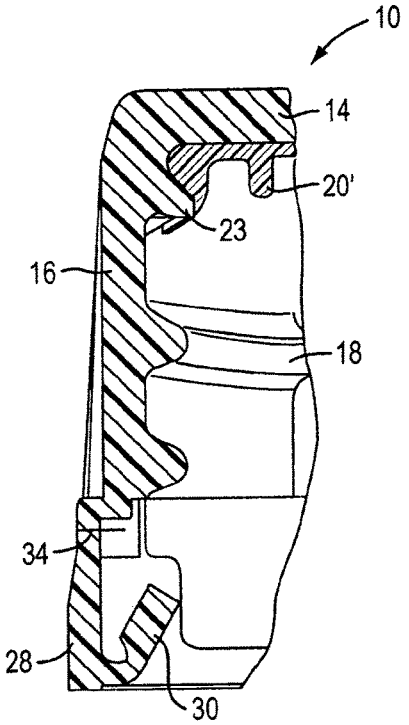
FIG. 6 is a fragmentary, diagrammatic view illustrating an alternate embodiment of a sealing portion of the closure illustrated in FIG. 1.

FIG. 6 illustrates an alternate embodiment of the closure illustrated in FIG. 1, wherein instead of integral plug seal element 20, the closure includes a separate sealing liner 20', which may be configured as shown to include an annular plug seal portion, which fits generally within the mouth of the associated container, and an outer seal portion formed generally adjacent to an annular lip 23 of the closure shell.

Operation of the tamper-evident package of this embodiment will be readily appreciated. Stop element 46 is positioned in predetermined relationship to the locking elements 42. Similarly, the flexible projections 30 of the closure tamper-evident band 26 are positioned in predetermined relationship to the start of thread formation 18, or other like element on the closure configured for cooperative engagement with the stop element 46. The sealing portion of the closure is positioned relative to the thread formation to move out of sealing engagement with the container after engagement of the tamper-evident band with the locking elements 42, to fracture the frangible connection provided by frangible bridges 32 (as shown in FIG. 1). The arrangement of the flexible projections, relative to the thread formation, provides the desired movement of the closure from its fully applied position through the desired predetermined angle prior to actuation of the tamper-evident feature.

Figure 6A:
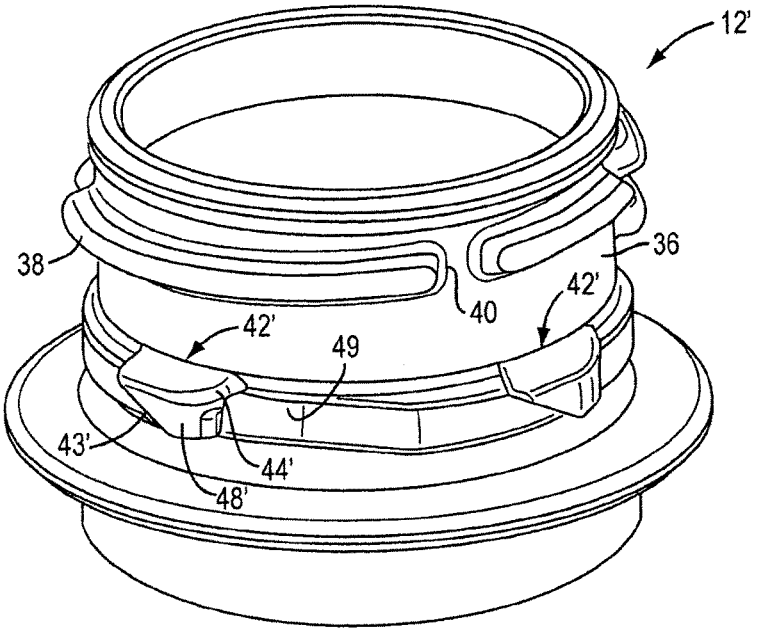
FIG. 6A is a diagrammatic view of a modified container construction for this embodiment of the present tamper-evident package.

FIG. 6A illustrates an alternate configuration for the container, designated 12', for this embodiment of the present tamper-evident package, which differs from the previously-described embodiment in that the stop surface of the container, engageable by the closure for limiting rotation beyond it fully applied position, is provided by one of the locking elements of the container, designated 42'.

In this embodiment, container 12' cooperates with closure 10 generally as described above during closure removal, to provide the desired tamper-evidence after the closure is rotated through the desired predetermined angle from its fully applied position. However, rather than providing a separate stop element such as 46 in the previous embodiment, at least one of, and preferably all of the locking elements 42' of this embodiment define a respective radially oriented stop surface 48. Each locking element further defines the desired inclined retention surface, designated 43, as well as a guide surface, designated 44', generally opposite the retention surface 43'.

In this embodiment, the closure 12' is preferably configured to define an inclined recessed region 49, having a relatively reduced diameter, which is positioned generally adjacent to the associated stop surface 48'. By this arrangement, during closure application, one of the flexible projections 30 on the associated closure can engage one of the stop surfaces 48' during closure application to limit rotational movement of the closure beyond its fully applied position. Because the stop surface 48' is positioned generally beneath the associated guide surface 44', this locking cooperation does not take place until the closure is sufficiently applied so that one or more of the projections 30 can move beneath the guide surface 44' for engagement with the stop surface 48'.

This form of the present invention desirably acts to position the closure on the container to achieve the desired predetermined delay as the closure is moved from its fully applied position, while avoiding premature fracture of the frangible bridges 32. By way of example, closure 10 can typically be formed such that the frangible connection provided between the tamper band and closure skirt by frangible bridges 32, and the associated score line 34 can exhibit a torque-carrying capacity of up to 15 inch-pounds, the intended torque at which the frangible connection fails. During closure application with automated equipment, capping heads can be adjusted to apply a pre-selected torque, for example, 15 inch-pounds of application torque.

During closure application, the frangible bridges are not excessively loaded since the tamper-evident band 26 does not meet resistance to application as the flexible projections 30 engage the guide surfaces 44' and move past the locking elements 42'. However, as the closure approaches its fully applied position, the projections 30 move generally beneath the level of the guide surfaces 44', while at the same time the sealing portion of the closure is being urged into sealing engagement with the associated container. Formation of the sealing interface typically creates resistance on the order of 12 inch-pounds, with subsequent engagement of one or more of the projections 30 with a respective stop surface 48' thus further providing, for example, 3-inch-pounds of resistance, at which point the capping head releases. As will be appreciated, the frangible bridges 32 are thus only subjected to torque on the order of the 3-inch-pounds of resistance created when one or more of the projections 30 engages a respective one of the stop surfaces 48'.

Figures 8A, 8B, 8C:
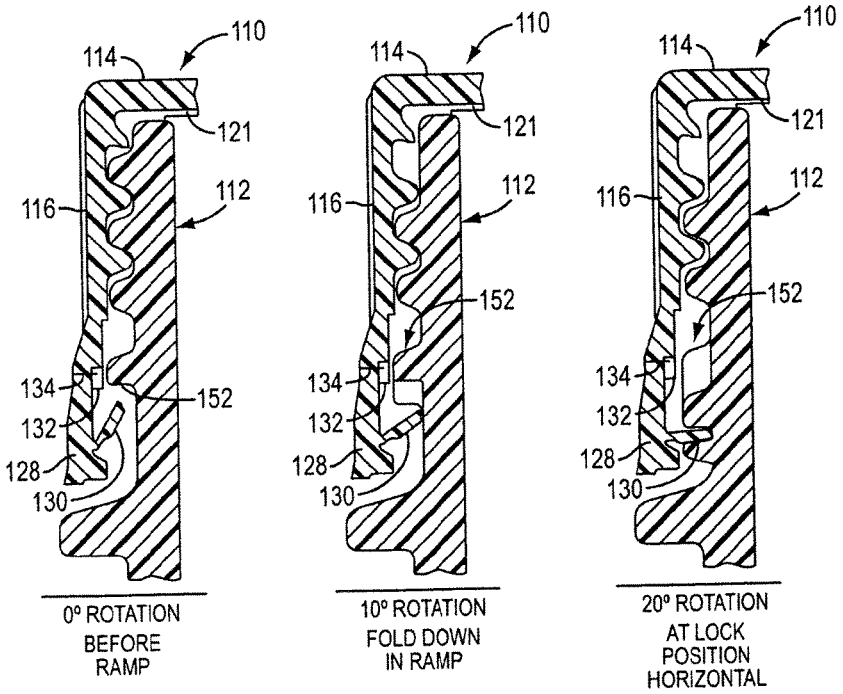
FIGS. 8A, 8B and 8C illustrate the container of FIG. 7 cooperating with an associated closure in this embodiment of the present tamper-evident package.
Figure 9:
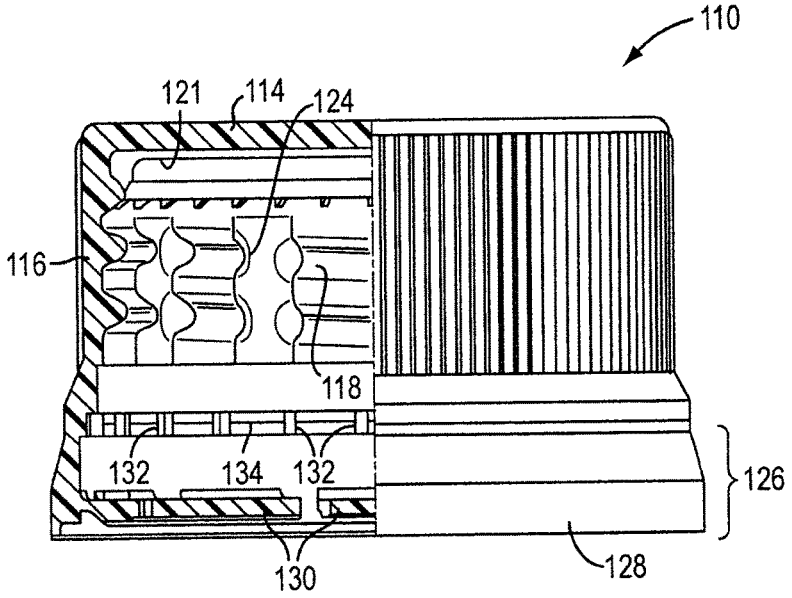
FIG. 9 is a diagrammatic view, partially cut away, of a tamper-evident closure for use with the container of FIG. 7 in this embodiment of the present tamper-evident package.

With reference to FIGS. 7-9, therein is illustrated an alternative embodiment of the present tamper-evident package. In this embodiment of the present tamper-evident invention, features of the construction generally corresponding to those of the previously-described embodiment are designated by like reference numerals in the 100 series.

In this embodiment, container 112 is provided with a plurality of circumferentially spaced locking elements, again sometimes referred to as a segmented locking ring, or locking ring projections. Notably, this embodiment of the present disclosure does not require the provision of a stop element such as at 46, to provide the desired predetermined angular movement of the closure from its fully applied position during initial closure removal.

As in the embodiment of FIG. 6, closure 10 is illustrated as including a separate sealing liner, indicated at 121, with the pilfer band 126 of the closure including a relatively larger number of circumferentially spaced, inwardly extending flexible projections 130, each movable about a respective horizontal axis at an edge thereof joined to band portion 128 of the pilfer band. In this illustrated embodiment, the tamper-evident pilfer band 126 is provided with 12 of the circumferentially spaced projections or tabs 130). In this embodiment, the locking elements on the container, designated 152, are configured to engage and "trap", and retain one of more of the flexible projections 130 of the associated tamper-evident band. To this end, each of the locking elements 152 defines a lower retention surface, including an inclined guide surface 154 terminating in a downwardly extending stop surface [56] *156*. Notably, the guide surface subtends an arc at least as large as the predetermined angle though which the closure rotates from its fully applied position prior to temper-evident band actuation.

The inwardly extending projections 130 of the tamper band are positioned and configured so that at least one of the projections is disposed between adjacent ones of the locking elements 152 when the closure is in its fully applied position. This one of the projections 130 is engageable with a respective one of the [stopped] *stop* surfaces 156 during opening movement of the closure from the fully applied position. By the provision of the inclined guide surface 154, the closure is movable through the predetermined angle prior to engagement of the projections 130 with the respective one of the [stops] *stop* surfaces 156, thus providing the desired delay prior to tamper-evident band actuation after movement of the closure from its fully applied position.

Depending upon the particularly desired configuration of the locking elements 152, stop surface 156 may be generally vertically oriented. In accordance with the illustrated embodiment, the lower retention surface of each of the locking elements 152 further defines a locking notch at the stop surface 156, defined by the further provision of lower portion 158 of each locking element, which forms a generally V-shaped configuration, together with stop surface 154. This V-shape configuration of each locking element desirably acts to trap and retain a respective one of the flexible projections 130 of the tamper-evident band during closure removal.

This embodiment of the present tamper-evident package provides another construction which achieves the desired minimal, predetermined delay during rotational removal of the closure before starting actuation of the tamper-evident event during removal. As will be recognized, the segmented locking reconstruction, including locking elements 152, provides the desired lead-in ramp/angles on the application side of the locking elements to prevent tamper-band immobilization during application. An advantage of this embodiment of the present invention is that the current Application Angle Distribution Variability does not need to be reduced in order to achieve the minimal predetermined delay during closure removal. As noted, the downwardly angled guide or cam surface 154 of the locking segments 152, subtends an arc which corresponds to the predetermined angle through which the closure is rotated from its fully applied position, prior to tamper-evident actuation. The end of the downward angling cam, in the unscrewing direction, terminates in the blunt stop surface 156, which can be vertically oriented, with the illustrated embodiment including a short horizontal, or near horizontal segment 158 extending back in the application direction. A "notch feature" is formed at the unscrewing end of each downwardly angled guide surface 154. Alternatively, the end of each downwardly angling guide surface 154 can terminate in a blunt vertical stop surface, such as 156, without the provision of the short horizontal or near horizontal segment 158 extending back in the application direction. The advantage of this alternate embodiment is that the tamper-evident band drop can be maximized to improve clear visual evidence of prior opening or tampering.

In this embodiment of the present tamper-evident package, the axially flexible tabs 130 of the closure tamper-evident band are symmetrically placed on the inside edge of the tamper band. These readily flexible tabs are folded inwardly and upwardly into the closure shell during closure manufacturing, and remain folded in a generally inward and upward direction prior to application of the closure on the container. The folded length of each closure or tab is nominally equal to the radial clearance between the inside wall of the closure band portion 128, and the outside diameter of the container finish, between the locking rings segments, with either a slight amount of clearance or interference being acceptable. It is thus possible for the tabs to flex downwardly into a horizontal position with minimum effort or torque.

The number of flexible tabs 130, and their circumferential length and location, are designed so that minimally one tab will always be located between each set of bottle finish locking elements during application, [irregardless] *regardless* of the variability associated with the closure Application Angle Distribution. The remainder of the tabs 130 end up radially sandwiched between the locking elements 152 and the inside surface of the band portion 128, and thus their free ends are unable to engage the underside of the cam surfaces of the locking elements [52] *152*. These tabs easily slip by the locking elements 152 during removal of the closure. When a consumer unscrews the closure to open the package, the free ends of the flexible tabs, located between the locking elements 152, quickly engage the undersides of the downwardly angling guide surfaces 154 immediately adjacent to their fully applied location. The action of each guide surface or cam is to fold its engaged tab downwardly into a horizontal position, at which time the tab engages the vertical wall of the stop surface 156 at the end of the guide surface 154 (see FIG. 8A, 8B, 8C). Because the length of the tabs 130 is specifically designed that only a slight amount of clearance or interference exists between the inside wall of the tamper band, and the outside diameter of the container between the locking ring segments, the folding of the tabs 130 into a final horizontal position takes an extremely small amount of torque, and thus is not a concern with respect to adding to the torque necessary to initially break the static coefficient of friction at the container/closure sealing interface.

The final engagement of the tabs 130 in the notches of the locking elements 154, or against the blunt vertical stop surface such as in the above-described alternative embodiment, effectively immobilizes the tamper band, and further opening rotation acts to break the frangible bridges 132 connecting the tamper-evident band to the closure shell. Since the guide or cam surfaces 154 have a minimum subtended arc corresponding to the desired predetermined angle, such as a minimum of 15 degrees, the tamper-evident band is always forced to rotate a minimum of this arc (e.g., 15 degrees) before the flexible tabs 130, originally located between the locking elements 152, are trapped in the notches, and the tamper band is immobilized. Thus, the required minimum predetermined delay (e.g., 15 degrees) necessary to break the static coefficient of friction at the seal interface is achieved without having to reduce the variability associated with the typical Application Angle Distributions.

Another advantage of this embodiment of the present invention is that when the tabs 130 are in a horizontal position, and loaded circumferentially, they are at their maximum strength with respect to resisting rotational movement, and thus become very effective in immobilizing the tamper band on the container finish.

Figure 10:
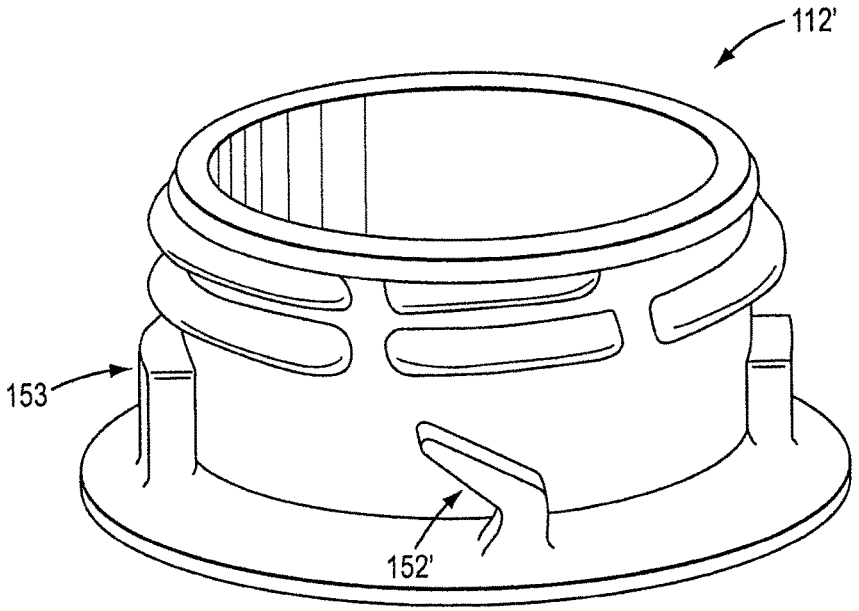

FIGS. 10 and 11 illustrate a modification of the container, designated 112', for this embodiment of the present tamper-evident package. This embodiment includes segmented locking ring elements in the form of circumferentially spaced locking elements 152' and 153, wherein locking ring elements 152' have been configured for weight savings, while still providing the desired cooperation with the associated tamper-evident flexible tabs of the closure of the package. Locking elements 153 provides the desired locking function, while including a lug which can be formed at the parting line of a mold within which the neck portion fo the container is formed.

FIG. 12 illustrates a further embodiment of the container, designated 113, for this embodiment of the present invention. In this embodiment of the container, locking elements 152" have been configured for weight-savings, with locking elements 153' again configured to provide a lug at the parting line of a mold within which the neck portion is formed.

Figure 12A:
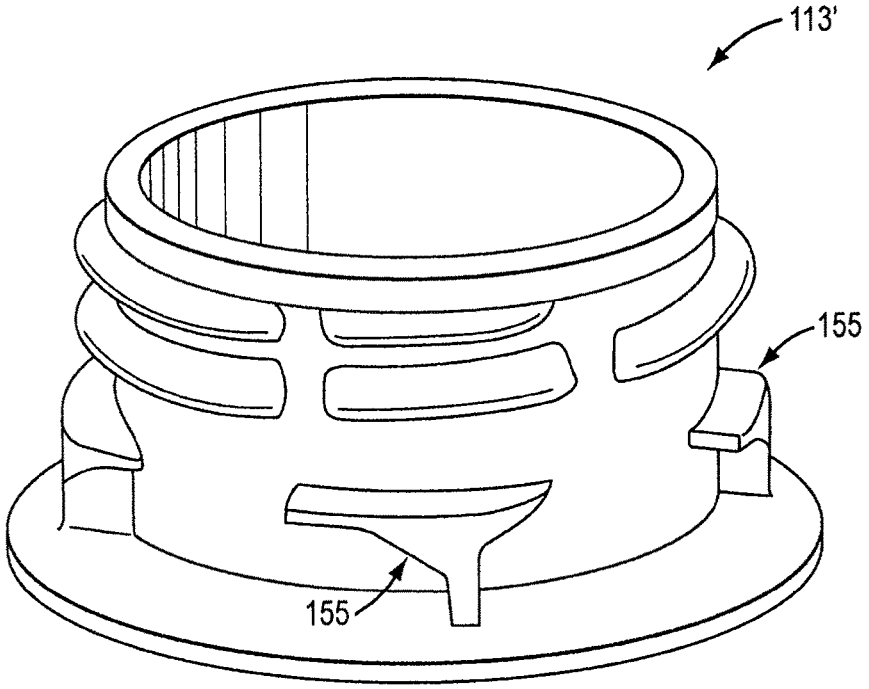
Figure 13:
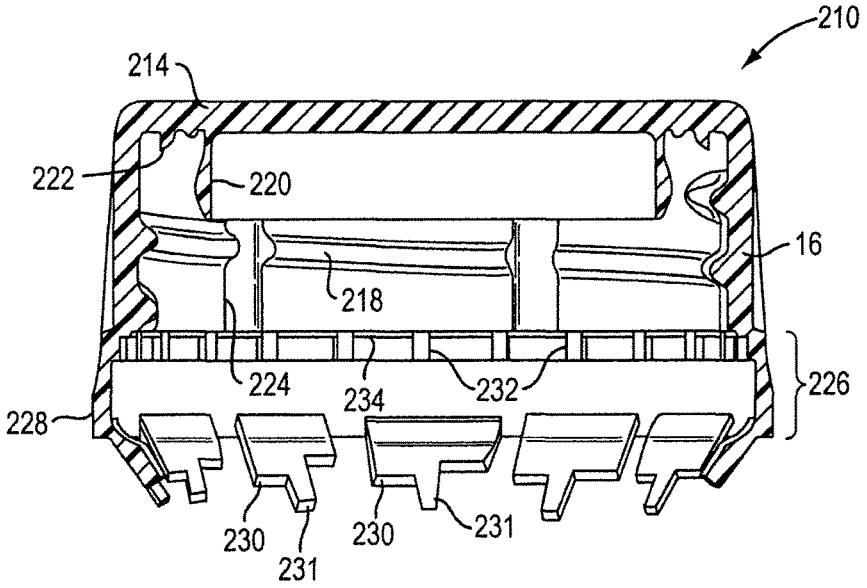
FIG. 13 is a diagrammatic view of a tamper-evident closure for use in a further embodiment of the present tamper-evident package.
Figure 14:
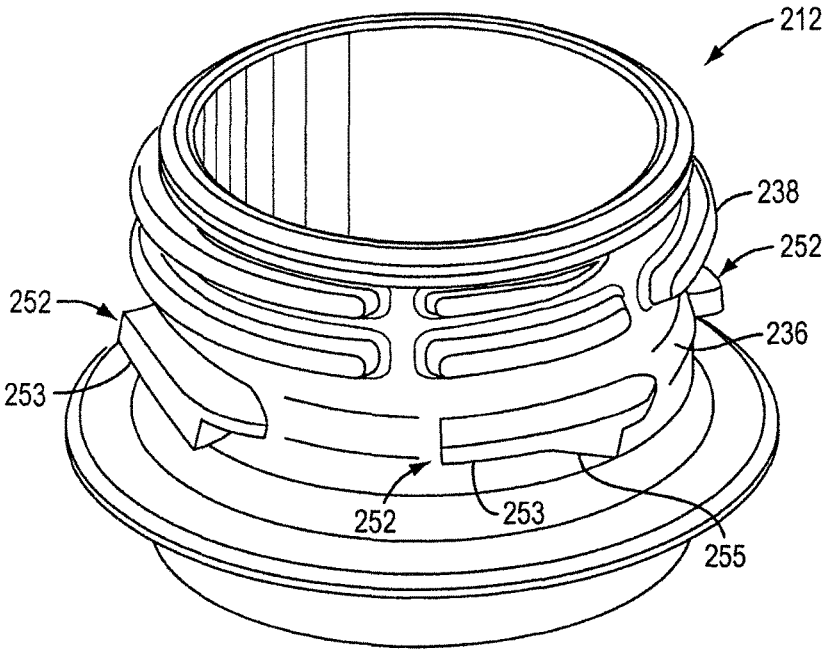
FIG. 14 is a diagrammatic view of a container for use with the closure of FIG. 13 for this embodiment of the present tamper-evident package.
Figure 15:
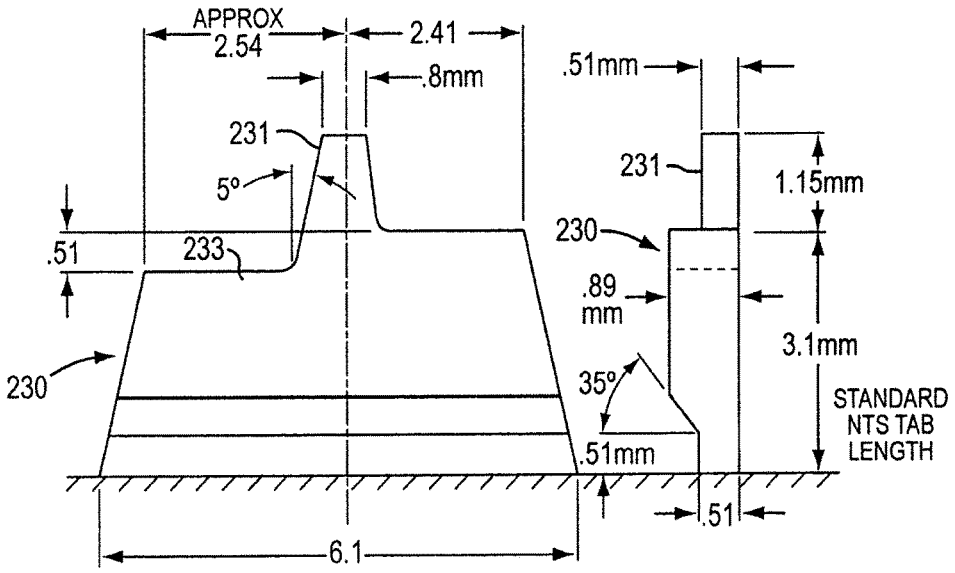
FIG. 15 illustrates diagrammatic views of the inwardly extending projections of the tamper-evident closure illustrated in FIG. 13.

FIG. 12A illustrates a further embodiment of the container, designated 113', for this embodiment of the present tamper-evident package, wherein locking elements 155 include cam or guide surfaces on the application side of the locking elements, engageable by the flexible tabs 130 of the associated closure during application. The locking elements 155 further include a horizontal extension of the lower guide surface, which can be configured to provide the desired delay as the associated closure is moved from its fully applied position.

A further embodiment of the present tamper-evident package is illustrated in FIGS. 13-16 A-C, including closure 210, and associated container 212. Elements of this embodiment which generally correspond to those of the previously-described embodiment are indicated by like reference numerals in the 200-series.

In the above-described embodiments of the present tamper-evident package, frangible bridges (32, 132) connecting the tamper band to the associated closure shell are configured to fail primarily in shear. As a consequence, a significant amount of opening torque is still required to break the tamper band for tamper-evidence. Even though this torque is delayed by the minimum predetermined angle (e.g., 15 degrees) of opening rotation, and therefore is no longer additive to the torque necessary to break the static coefficient of friction of the container/closure sealing interface, the consumer may still find the level of torque necessary to break the tamper band to be somewhat objectionable.

This further embodiment of the present tamper-evident package provides the desired minimum predetermined angular rotation from the fully applied position of the closure before the tamper-evident band breakage event, while also loading the frangible bridges of the closure in a combination of tension and shear to reduce the total torque necessary to break the tamper ban.

In this embodiment, the container 212 includes a segmented locking ring in the form of circumferentially spaced locking elements 252 configured for cooperation with the tamper-evident band during removal of the closure from the container for fracturing the frangible connection between the pilfer band and the associated skirt portion of the closure. In the illustrated embodiment, each of the locking elements 252 includes a lower, generally horizontal guide or cam surface 253, and an inclined retention surface 255 extending at an angle downwardly from the respective guide surface 253. The horizontal guide surface 253 may be configured to subtend an arc on the order of approximately 20 degrees, leading into the downwardly angling cam or retention surface 255, having a subtended arc such as on the order of approximately 17 degrees. Thus, the guide surface 252 subtends an arc at least as large as the predetermined angle through which the closure is rotated from its fully applied position prior to tamper-band actuation.

In this embodiment, a plurality of axially flexible projections or tabs 230 are provided on the inside of band portion 238 of the closure tamper-evident band 226. The flexible projections 230 are folded inwardly and upwardly into the closure shell during the closure manufacturing process, and remain folded in a generally inward and upward direction prior to application of the closure to the container. The folded length of each projection 230 is significantly longer than the radial clearance between the inside surface of the tamper band portion 238, and the outside diameter of the container finish, between the locking elements 252. This dimensioning prevents the projections from easily folding downward into a horizontal position after the closure is fully applied to the container.

As illustrated, all of the tabs or projections 230 have a "finger feature", provided in the form of a relatively flexible extension element 231 for projecting from a free edge portion of each of the projections 230. In this embodiment, the extension element 231 is located at approximately one-half the subtended arc of each of the projections 230, with the thickness of the extension element 231 being approximately one-half the thickness of the associated projection 230 (see FIG. 15).

One function of the extension element 231 is to hold the associated projection 232 radially outward of the locking elements 252 during closure application, and to prevent the free end of the projection 230 from folding under the horizontal guide surface 253 of a locking element 252 prematurely. A further purpose of the extension element 231, as will be further described, is to prevent the free end of the projections 230 which are positioned for insufficient angular delay from the fully applied position of the closure (termed "non-working tabs" or "non-working projections") from engaging the cam or guide surfaces of the locking elements 252 prematurely upon removal of the closure from its fully applied position.

During closure application, some of the projections or tabs 230 (termed "working tabs") are geometrically ensured to end up positioned between the locking elements 252, regardless of the application angle variability. The free ends of these "working tabs" are now properly positioned to engage the horizontal guide surface 253 and subsequently the downwardly angled retention or cam surface 255 during removal of the closure, and will provide the force necessary to break the frangible bridges 232 connecting the tamper band to the closure shell.

The free ends of the remainder of the tabs or projections 230 (termed "non-working tabs") are still held radially outboard of the locking ring segments by their respective extension elements 231, and will naturally slip by the locking elements 252 during closure removal. Whether a particular tab or projection becomes a "working tab" or a "non-working tab" is dependent on the ultimate application angle of the closure in the fully applied position. However, the number of tabs or projections, and their positioning coupled with the number of locking elements 252, guarantee that a predetermined number of the tabs or projections 230 will always end up as "working tabs".

The first event that occurs during removal of the closure by the consumer is that the relatively fragile extension elements 231 on the "working tabs" engage the removal edges of the locking elements 252, and are deflected and folded backward in a circumferential direction into a recess 233 (FIG. 15) defined in the free edge portion of the tab or projection 230. Thus, by this action, the extension element 231 is movable into the recess 233 when at least one of the projections 230 engages the guide surface 253 of an associated one of the locking elements 252 during movement of the closure from its fully applied position.

By this action, the free end of the projection 230 remains under the horizontal guide surface 253 during initial closure removal.

During further rotation for removal, the "working tabs" then travel a minimal predetermined angle (e.g., 15 degrees) horizontally before they engage the angled retention surface 255 of the locking elements 252. This travel under the horizontal guide surface 253 provides the required delay, allowing breaking of static coefficient of friction at the container/closure seal interface to occur before the tamper band actuation event occurs, and thus desirably eliminates the additive torque effect of these two events.

Once the "working tabs" engage the downwardly angled retention surface 255, frangible bridges 232 are loaded in a combination of shear and tension, which will reduce the torque required to break the tamper band away from the closure shell. Also, since the closure shell is moving axially upwardly under the influence of the container thread helix angle, and simultaneously the tamper band is being forced axially downward by the helix angle of the downwardly angled retention surface 255, the speed of separation between the closure shell and the tamper band is significantly increased. The net effect of this separation speed increase is to cause the frangible bridges 232 to fail earlier than they would if the speed of separation were less.

Figure 16:
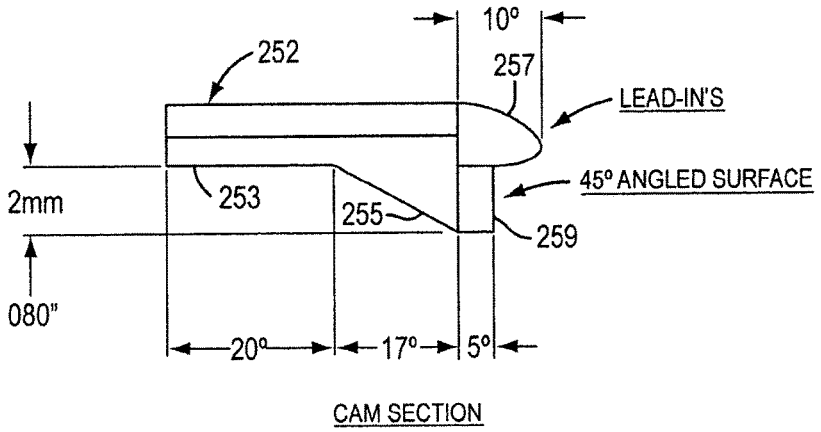
FIG. 16 is a diagrammatic view of a container locking element of the container illustrated in FIG. 14 for this embodiment of the present tamper-evident package.
Figure 16A:
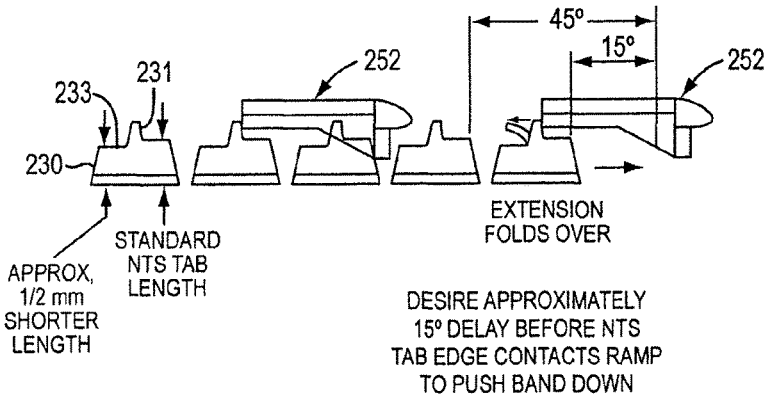
FIG. 16A is a diagrammatic view illustrating operation of this embodiment of the present tamper-evident package.

As illustrated in FIG. 16A, each of the locking elements 252 is preferably provided with ramped or cammed lead-in surfaces 257 and 259, which desirably act to guide the projections 230 of the closure over the locking elements during closure application to the container while avoiding premature fracture of frangible bridges 232.

Figure 16B:
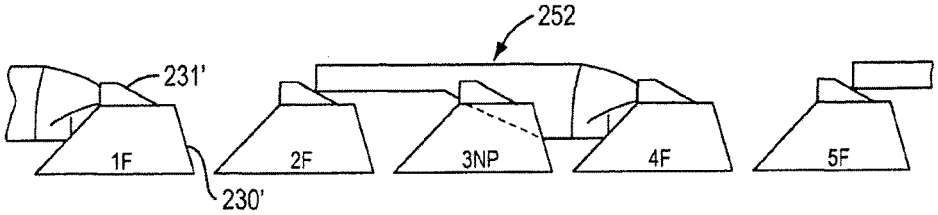
FIG. 16B and 16C are a diagrammatic views illustrating an alternate construction for this embodiment of the present invention.
Figure 16C:
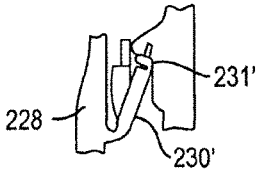

FIGS. 16B, 16C illustrate an alternate embodiment for the flexible projections of this embodiment, with this configuration of the flexible projections designated 230', with each projection including an extension element 231'. As illustrated, each of the extension elements 231' defines a camming surface for engagement with a guide surface of a respective one of the locking elements 252 during closure removal, whereby the extension element is deflected radially outwardly. As described above, this action of the extension element provides the desired cooperation with the locking element 252 to permit movement of the closure, during removal, through the desired predetermined angle prior to actuation of the tamper-evident band by engagement of one or more of the flexible projections 231' with a retention surface 255 of a respective one of the locking elements 252.

Figure 17:
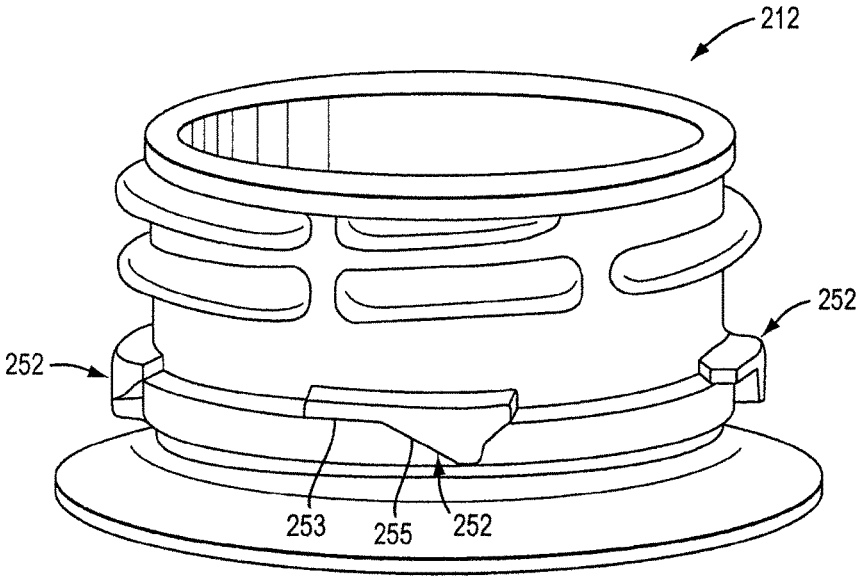
FIG. 17 is an alternative embodiment of the container illustrated in FIG. 14 for this embodiment of the present tamper-evident package.

FIG. 17 is a further illustration of the container 212, including locking ring segments in the form of locking elements 252, each having a horizontal guide or cam surface 253, and an inclined retention of cam surface 255.

As will be appreciated from the foregoing disclosure, the present invention provides a tamper-evident package including a threaded closure and container which cooperate to provide closing of the package at a sealing interface thereof, with the closure including a plurality of frangible bridges or like fracturable connections to provide the package with a tamper-evident feature. In accordance with the present invention, a planned or predetermined delay is provided when the closure is moved from its fully applied position prior to actuation of the tamper-evident feature, and/or before development of significant torque of actuation.

The planned delay is intended to provide removal torque control by separating the torque necessary to break the static coefficient of friction of the seal from the torque necessary to actuate the tamper-evident feature, thereby eliminating potential additive effect of these two distinct torque distributions. By the present invention, a tamper-evident package is provided such that less than 15% of all packages never exceed a predetermined removal torque. This predetermined value is preferably 20-inch-pounds, more preferably 17-inch-pounds, and most preferably 15-inch-pounds.

The present tamper-evident package is configured such that the unscrewing angle of tamper-evident actuation is preferably less than 180 degrees, more preferably less than about 90 degrees, and most preferably less than about 60 degrees.

Appended Test Protocols set forth procedures for determining removal torque performance of plastic closures, and closure carbonation retention to provide Carbonated Soft Drink sealing performance. In one form of the present invention, a tamper-evident package is provided that provides: (1) Carbonated Soft Drink sealing performance; (2) an opening torque of no more than about 17 inches-lbs.; (3) fracture of the frangible connection of the tamper band prior to sealing the sealing portion of the closure moving out of sealing engagement with the container at a probability of 20-200 in 10,000.

Test Protocols

Elevated Temperature Carbonation Retention

For Regions Where The Climate Is Extremely Hot

1. PURPOSE:

1.1. This test is for determining the ability of the plastic closure to retain carbonation when subjected to storage and shipping conditions which occur in climates where temperatures reach 108° F./42° C.

1.1.1. This test is intended for carbonated soft drink.

2. REQUIREMENTS:

2.1. Samples subjected to elevated temperatures must retain carbonaton levels equal to that of a control.

3. RESPONSIBILITIES:

3.1. The Laboratory Manager and Supervisor are responsible for maintaining this procedure.

3.2. The Laboratory Manager, Supervisor, and Laboratory Technicians are responsible for performing this procedure.

3.3, The Calibration Technician is responsible for maintaining calibration as scheduled and notify all Laboratory Personnel of any equipment found to be out of tolerance.

3.4. The Calibration Technician is responsible for maintaining calibration as scheduled and notifying all Laboratory personnel of any equipment found to be out of tolerance.

4. SAFETY REQUIREMENTS:

4.1. Safety glasses MUST be worn in designated areas.

4.2. Safety shoes MUST be worn in designated areas.

4.3. The No Jewelry policy MUST be adhered to in designated areas.

4.4. Be sure to properly vent test packages prior to removing from test fixture.

4.5. Glass bottles MUST be encased in a protective shield to prevent injury to the technician during testing.

5. SAMPLE COLLECTION:

5.1. To be determined by the requestor.

5.2. A control closure MUST accompany a test closure.

5.3. Recommended that closures and bottles be randomly selected from the same lots to reduce the effect of variation in the test results.

5.4. Test and control closures should be collected from the same molding and lining machine if testing material properties.

6. SAMPLE PREPARATION:
6.1. Closures and bottles must be inspected and must be within respective blueprint specifications, unless specified by the requestor.
6.1.1. Refer to Closure Measurement Procedure 654-037 and Bottle Finish Measurement Procedure 654-035 for instructions on performing measurements.
6.2. Closures must be applied to Alcoa CSI specifications or per the requestors' needs.
6.2.1. If Necessary—Refer to Alcoa CSI Closure application and Specifications Manual.
6.2.2. The requestor may specify certain parameters, which need to be documented.
6.3. The product can be obtained from a bottling line or acquired in a laboratory fill.
6.4. Sample packages, both test and control, are to be randomly filled according to the specifications for the package being filled. Refer to filling specification guidelines, test number 654-033/Item ID 003676157.
6.5. PET or glass packages are to be randomly selected from the fill before conditioning.
7. SAMPLE SIZE:
7.1. Sample size may be selected from the 28 mm Protocol and Sample Size charges provided in the Document Management System.
7.2. To be determined by the requestor or by the needs of the test.
7.3. Recommended sample size is 12 samples per variable per data point.
8. EQUIPMENT REQUIRED:
8.1. Zahm Nagel Tester, Lan Monitor, or equivalent equipment for calculation of amount of dissolved carbon dioxide gas.
8.2. Appropriate chart, table or formula for calculation of amount of dissolved carbon dioxide gas.
8.3. Filling equipment or chemicals capable of filling at 4.0+/−0.2 volumes carbonation.
8.4. Alcoa 201 capping machine or equivalent, to apply closures to manufacturer's specification.
8.5. Environmental chamber capable of maintaining the temperatures stated in 6.5.
9. PROCEDURE:
9.1. Condition the filled packages at 108° F./42° F./1° C.+/−2° F./1° C. for 1, 3, 7, 10 and 14 day time periods.
9.1.1. Glass packages are to be conditioned at 122.2° F./50° C.+/−2° F./1° C. for 1, 3, 7, and 10 day time periods.
9.2. At the required time points, remove the samples from the elevated temperature conditioning, and store the samples at ambient temperatures (72° F./22° C.+/−2° F./1° C.) for 24 hours prior to testing.
9.3. After stabilizing the samples at ambient conditions for 24 hours, check the carbonation level.
9.4. Follow the appropriate SOP for use of the equipment used.
9.4.1. Zahm Nagel SOP test number 654-009.
9.4.2. Computerized Zahm Nagel SOP test number 654-110.
9.5. Repeat testing until all samples have been tested.
9.6 Repeat above steps at each test interval.
9.7 After all testing is performed enter the data into the appropriate form, calculating the average, standard deviation, minimum and maximum readings.
9.8. Enter any comments or observations on the appropriate form.
9.9. Dispose of the test packages according to Laboratory Recycling Policy, test number 654-036.
9.10.1. Use a "T" test to determine the difference between two means.
9.10.2. Use a one-way Anova to compare the differences between three or more variables.

Removal Torque Test Procedure
1. Purpose:
1.1. The test is designed to determine the removal torque performance of a plastic closure applied to a bottle filled with either carbonated or non-carbonated product.
1.1.1. This test is intended for carbonated product, beer, nitrogen induced product, liquor, or non-pressurized packages.
2. Requirements:
2.1. Removal Torque value should be within respective closure specifications.
3. Responsibilities:
3.1. The Laboratory Manager and Supervisor are responsible for maintaining this procedure.
3.2. The Laboratory Manager, Supervisor, and Laboratory Technicians are responsible for performing this procedure.
3.3. The Laboratory Manager, Supervisor and Laboratory Technicians performing the test are responsible for verifying that calibrations are current on the equipment being used and that values obtained during validations are within the respective control limits which are posted.
3.4. The Calibration Technician is responsible for maintaining calibration as scheduled and notifying all Laboratory personnel of any equipment found to be out of tolerance.
4. Safety Requirements:
4.1. Safety glasses MUST be worn in designated areas.
4.2. Safety shoes MUST be worn in designated areas.
4.3. The No Jewelry policy MUST be adhered to in designated areas.
5. Sample Collection:
5.1. To be determined by the requestor.
5.2. Recommended that closures and bottles be randomly selected from the same lots to reduce the effect of variation in the test results.
5.3. Test and control closures should be collected from the same molding and lining machine if testing material properties.
6. Sample Preparation:
6.1. Closures and bottles must be inspected and must be within respective blueprint specifications, unless specified by the requestor.
6.1.1. Refer to Closure Measurement Procedure 654-037 and Bottle Finish Measurement Procedure 654-035 for instructions on performing measurements.
6.2. Closures must be applied to Alcoa CSI specifications or per the requestors' needs.
6.2.1. If Necessary—Refer to Alcoa CSI Closure Application and Specifications Manual.
6.2.2. The requestor may specify certain application parameters, which need to be documented.
6.3 The product can be obtained from a bottling line or acquired in a laboratory fill.
6.4 Sample packages, both test and control, must be randomly filled according to the specifications for the package being filled. Refer to filling specification guidelines, test number 654-033/Item ID 003676157.
6.5. Packages must be randomly selected from the fill and conditioned at the following temperatures, unless otherwise stated in appropriate form:

6.51. 40° F./4.4° C.+/−2° F./1° C.
65.2. 70° F./21.2° C.+/−2° F./1° C.
6.5.3. 100° F./37.7° C.+/−2° F./1° C.
6.5.4. 108° F./42.2° C.+/−2° F./1° C.
7. Sample Size
7.1. Should be determined by the requestor or the needs of the test.
7.2. Recommended sample size is 12 per variable.
8. Equipment
8.1. Secure Pak MRA meter or equivalent.
8.2. Storage areas capable of maintaining temperatures as specified in 6.5.
8.3. Equipment needed for filling as per the closure requirement:
8.3.1. Filling equipment capable of filling at 4.0+/−0.2 volumes carbonation
8.3.2. Supply of still water
8.3.3. Balance to verify water weight if needed
8.4. Alcoa 201 capping machine or equivalent, to apply closures to manufacturer's specification.
9. Procedure:
Test the Packages at Conditioning Temperature. Remove No More than 2 Samples at a Time to Test from the Respective Conditioning Room.
9.1. Center the holding pegs on the torque meter.
9.2. Validate the torque meter using required Vibrac Gold Bottle (SOP #654-183),
9.3. Securely tighten the bottle in the holding pegs. (Do not allow the bottle to rotate when force is applied)
9.3.1. For the MRA—Tighten by turning the knob on the right hand side of the meter.
9.4. Place the indicator/readout at "0" on the torque meter.
9.4.1. For the MRA—Turn the two knobs located under the face of the scale inward so as to locate the indicators at the zero mark on the scale.
9.5. Engage the closure:
9.5.1. Using the Secure Pak MRA, grip the closure securely by hand (unless stated by the requestor to use a hand chuck).
9.6. Remove the closure.
9.6.1. Using the Secure Pak MRAv, turn the closure counter-clockwise in a slow continuous motion at 2 in-lbs per second until the closure seal begins to slip on the bottle finish. (The closure does not need to be turned to the point of venting.) NOTE: DO NOT RE-GRIP THE CLOSURE, SNAP THE WRIST, OR USE A RAPID JERKING MOTION WHEN TAKING THE REMOVAL TORQUE.
9.7. Record the torque that the closure seal broke loose from the bottle finish.
9.8. Continue testing following steps 9.3 through 9.6 until all samples have been tested for the given test period.
9.9. After all testing is complete, validate the torque meter again and record value.
9.10. From the data obtained calculate the average, standard deviation, minimum, maximum, and 3 sigma readings.
9.11. Document any comments or observations in your report.
9.12. Create an excel spreadsheet for the data. Include the average, standard deviation, minimum, and maximum for each variable tested
9.13. Dispose of the PET bottles and closures according to the recycling policy. Lab SOP number 654-036/Item ID 003686608.

From the foregoing, it will be observed that numerous modifications and variations can be effected without departing from the true spirit and scope of the novel concept of the present invention. The present disclosure is to be considered as an exemplification of the invention, and is not intended to limit the invention to the specific embodiments illustrated. The disclosure is intended to cover, by the appended claims, all such modifications as fall within the scope of the claims.

What is claimed is:

1. A tamper-evident bottle comprising:
a neck having:
an outer thread helix;
a lower ring;
circumferentially spaced locking elements disposed between said outer thread helix and said lower ring;
a stop element disposed axially above said locking elements and axially below said outer thread helix; and,
a flange defining an open mouth and an upper interior wall;
a removable closure comprising:
a closed top wall;
an annular seal depending from an interior portion of said closed top wall;
a skirt depending from said closed top wall, said skirt comprising:
an inner thread helix;
circumferentially spaced vent grooves traversing the inner thread helix to vent gas pressure within said bottle;
a tamper-evident band comprising circumferentially spaced inwardly extending flexible projections;
frangible bridges connecting said tamper-evident band to said skirt; and, rotation-inhibiting projections;
wherein said removable closure is rotatable on said neck between:
a sealed closed position having an angle A1, wherein said inner thread helix of said removable closure sealingly engages said outer thread helix of said neck, said annular seal sealingly engages said upper interior wall of said neck, and said frangible bridges are unbroken;
an initial unsealing position having an angle A10 wherein said inner thread helix of said removable closure initially unseals from said outer thread helix of said neck, said annular seal initially unseals from said upper interior wall of said neck, and said frangible bridges are unbroken;
an initial fracturing [positing] *position* having a Band Break Angle wherein said locking elements of said neck cooperate with said flexible projections of said tamper-evident band to initially fracture said frangible bridges; and,
an unsealed open position wherein said frangible bridges are fractured and said closure is removed from said neck;
wherein an Initial Unlock Torque is required to rotate said removable closure from said sealed closed position to said initial unsealing position.

2. The tamper-evident bottle of claim 1, wherein said rotation-inhibiting projections engage said neck when said closure is rotated from said sealed closed position to said unsealed open position.

3. The tamper-evident bottle of claim 2, wherein said rotation-inhibiting projections create a Projection Resistive Torque when said closure is rotated from said sealed closed position to said unsealed open position.

*4. A tamper-evident closure for a container having a neck having an outer thread helix, a lower ring, circumferentially*

*spaced locking elements disposed between the outer thread helix and the lower ring, a stop element disposed axially above the locking elements and axially below the outer thread helix, and a flange defining an open mouth and an upper interior wall, said closure being removable and comprising:*

*a closed top wall;*

*an annular seal depending from an interior portion of said closed top wall;*

*a skirt depending from said closed top wall, said skirt comprising: an inner thread helix; and circumferentially spaced vent grooves traversing the inner thread helix to vent gas pressure within the container;*

*a tamper-evident band comprising circumferentially spaced inwardly extending flexible projections;*

*frangible bridges connecting said tamper-evident band to said skirt; and*

*rotation-inhibiting projections;*

*wherein said closure is rotatable on said neck between:*

*a sealed closed position having an angle A1, wherein said inner thread helix of said removable closure sealingly engages said outer thread helix of said neck, said annular seal sealingly engages said upper interior wall of said neck, and said frangible bridges are unbroken;*

*an initial unsealing position having an angle A10 wherein said inner thread helix of said removable closure initially unseals from said outer thread helix of said neck, said annular seal initially unseals from said upper interior wall of said neck, and said frangible bridges are unbroken;*

*an initial fracturing position having a Band Break Angle wherein said locking elements of said neck cooperate with said flexible projections of said tamper-evident band to initially fracture said frangible bridges; and*

*an unsealed open position wherein said frangible bridges are fractured and said closure is removed from said neck;*

*wherein an Initial Unlock Torque is required to rotate said removable closure from said sealed closed position to said initial unsealing position.*

*5. The tamper-evident closure of claim 4, wherein:*

*said rotation-inhibiting projections engage said neck when said closure is rotated from said sealed closed position to said unsealed open position.*

*6. The tamper-evident closure of claim 5, wherein:*

*said rotation-inhibiting projections create a Projection Resistive Torque when said closure is rotated from said sealed closed position to said unsealed open position.*

*7. A tamper-evident package comprising:*

*a container having a neck, the neck including an outer thread helix formation, a plurality of circumferentially spaced locking elements, a stop element disposed axially between said locking elements and said outer thread helix formation, and an upper interior wall defining an open mouth; and*

*a closure including a closed top wall, an annular seal depending from an interior portion of said closed top wall, a skirt portion depending from said closed top wall, said skirt portion including an inner thread helix formation, a plurality of circumferentially spaced vent grooves traversing the inner thread helix formation to vent gas pressure within said package, a tamper-evident band comprising a plurality of circumferentially spaced, inwardly extending flexible projections; and frangible bridges connecting said tamper-evident band to said skirt portion;*

*wherein said removable closure is rotatable on said neck between:*

*a sealed closed position having an angle A1, wherein said inner thread helix formation of said closure sealingly engages said outer thread helix formation of said neck to form an annular seal, said annular seal sealingly engages said upper interior wall of said neck, and said frangible bridges are unbroken;*

*an initial unsealing position wherein said inner thread helix formation of said closure initially unseals from said outer thread helix formation of said neck, said annular seal initially unseals from said upper interior wall of said neck, and said frangible bridges are unbroken;*

*an initial fracturing position having a Band Break Angle wherein said locking elements of said neck cooperate with said flexible projections of said tamper-evident band to initially fracture said frangible bridges; and*

*an unsealed open position wherein said frangible bridges are fractured and said closure is removed from said neck.*

*8. The tamper-evident package of claim 7, wherein the neck further includes a lower ring.*

*9. The tamper-evident package of claim 8, wherein the circumferentially spaced locking elements are disposed between said outer thread helix formation and said lower ring.*

*10. The tamper-evident package of claim 7, wherein the closure further includes rotation-inhibiting projections.*

*11. The tamper-evident package of claim 10, wherein the rotation-inhibiting projections are positioned on the closure to minimize simultaneous disposition of the rotation-inhibiting projections in respective one of said circumferentially spaced vent grooves.*

*12. The tamper-evident package of claim 7, wherein each of said circumferentially spaced locking elements includes a guide surface and an inclined retention surface, said guide surface being located opposite of the inclined retention surface, said locking elements being configured to engage said flexible projections of said closure during closure application.*

*13. The tamper-evident package of claim 7, wherein said stop element includes an inclined guide surface and a radially oriented stop surface, said stop element configured to engage said inner thread helix formation of said closure.*

*14. A tamper-evident closure for a container having a neck having an outer thread helix formation, a plurality of circumferentially spaced locking elements, a stop element disposed axially between the locking elements and the outer thread helix formation, and an upper interior wall defining an open mouth, said closure comprising:*

*a closed top wall;*

*an annular seal depending from an interior portion of said closed top wall;*

*a skirt portion depending from said closed top wall, said skirt portion comprising an inner thread helix formation, and a plurality of circumferentially spaced vent grooves traversing the inner thread helix formation to vent gas pressure within the container;*

*a tamper-evident band comprising circumferentially spaced, inwardly extending flexible projections; and*

*frangible bridges connecting said tamper-evident band to said skirt portion;*

*wherein said closure is rotatable on said neck between:*

*a sealed closed position having an angle A1, wherein said inner thread helix formation of said closure sealingly engages said outer thread helix formation of said neck,*

*said annular seal sealingly engages said upper interior wall of said neck, and said frangible bridges are unbroken;*

*an initial unsealing position wherein said inner thread helix formation of said removable closure initially unseals from said outer thread helix formation of said neck, said annular seal initially unseals from said upper interior wall of said neck, and said frangible bridges are unbroken;*

*an initial fracturing position having a Band Break Angle wherein said locking elements of said neck cooperate with said flexible projections of said tamper-evident band to initially fracture said frangible bridges; and*

*an unsealed open position wherein said frangible bridges are fractured and said closure is removed from said neck.*

*15. The tamper-evident closure of claim 14, wherein the closure further includes rotation-inhibiting projections.*

*16. The tamper-evident closure of claim 15, wherein the rotation-inhibiting projections are positioned on the closure to minimize simultaneous disposition of the rotation-inhibiting projections in respective one of said circumferentially spaced vent grooves.*

*17. A tamper-evident package comprising:*

*a container having a neck portion defining an open mouth, the neck portion having at least one outer helical thread formation thereon, a plurality of circumferentially spaced locking elements and a stop element, each of said locking elements including a guide surface and an inclined retention surface; and*

*a closure comprising a top wall portion, a depending skirt portion having at least one internal, helical thread formation for threaded engagement with a respective one of said external, helical thread formation of said container, a sealing portion configured to sealingly engage said neck portion of said container when said closure is in a fully applied position on said container, a tamper-evident band connected by a frangible connection to said skirt portion for engagement with said container during removal of said closure from said container, said tamper-evident band including a plurality of circumferentially spaced, inwardly extending flexible projections,*

*wherein said package defines an Angle A1 from said fully applied position at which said sealing portion of the closure and said neck of said container create an initial unlock torque;*

*wherein said plurality of circumferentially spaced locking elements is configured for cooperation with said tamper-evident band during removal of said closure from said container for fracturing said frangible connection,*

*wherein said stop element is configured to engage said at least one internal, helical thread formation,*

*wherein said inwardly extending projections on said tamper-evident band are positioned and configured so that at least one of said projections is disposed between adjacent ones of said locking elements on said container when said closure is in said fully applied position,*

*wherein said one of said inwardly extending projections are engageable with a respective one of said locking elements during opening movement of said closure from said fully applied position, said closure being moveable through a predetermined angle, greater than said Angle A1, prior to engagement of said one projection with the respective one of said locking elements for fracturing said frangible connection.*

*18. The tamper-evident package of claim 17, wherein said predetermined angle is from about 5 to about 20 degrees.*

*19. The tamper-evident package of claim 17, wherein said closure further includes circumferentially spaced vent grooves traversing the inner thread helix to vent gas pressure within said package.*

*20. The tamper-evident package of claim 17, wherein each of said stop surfaces is generally horizontally orientated.*

*21. The tamper-evident package of claim 17, wherein said circumferentially spaced locking elements form a segmented locking ring for axially retaining said temper-evident band on said container.*

*22. The tamper-evident package of claim 17, wherein the closure further includes rotation-inhibiting projections.*

*23. The tamper-evident package of claim 22, wherein the rotation-inhibiting projections are positioned on the closure to minimize simultaneous disposition of the rotation-inhibiting projections in respective one of said circumferentially spaced vent grooves.*

* * * * *